US012638182B2

(12) United States Patent
Wada et al.

(10) Patent No.: US 12,638,182 B2
(45) Date of Patent: May 26, 2026

(54) GAS TURBINE COMBUSTOR AND GAS TURBINE

(71) Applicant: MITSUBISHI HEAVY INDUSTRIES, LTD., Tokyo (JP)

(72) Inventors: Yasuhiro Wada, Tokyo (JP); Kazuki Abe, Tokyo (JP); Keita Yunoki, Tokyo (JP); Shohei Numata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/842,911

(22) PCT Filed: Mar. 7, 2023

(86) PCT No.: PCT/JP2023/008476

§ 371 (c)(1),
(2) Date: Aug. 30, 2024

(87) PCT Pub. No.: WO2023/176570

PCT Pub. Date: Sep. 21, 2023

(65) Prior Publication Data

US 2025/0180209 A1 Jun. 5, 2025

(30) Foreign Application Priority Data

Mar. 14, 2022 (JP) ................................. 2022-039453

(51) Int. Cl.
*F23R 3/16* (2006.01)
*F23R 3/00* (2006.01)
(Continued)

(52) U.S. Cl.
CPC ................ *F23R 3/16* (2013.01); *F23R 3/002* (2013.01); *F23R 3/46* (2013.01); *F05D 2270/08* (2013.01); *F23R 3/18* (2013.01)

(58) Field of Classification Search
CPC .... F23R 3/16; F23R 3/002; F23R 3/46; F23R 3/18; F05D 2270/08
See application file for complete search history.

(56) References Cited

U.S. PATENT DOCUMENTS

2012/0125006 A1 5/2012 Saito et al.
2017/0299182 A1* 10/2017 Miyauchi .................. F23R 3/46
(Continued)

FOREIGN PATENT DOCUMENTS

JP 2011-102669 5/2011
JP 2017-180899 10/2017
(Continued)

OTHER PUBLICATIONS

International Search Report issued May 16, 2023 in International Application No. PCT/JP2023/008476.
(Continued)

*Primary Examiner* — Phutthiwat Wongwian
*Assistant Examiner* — Rene D Ford
(74) *Attorney, Agent, or Firm* — Wenderoth, Lind & Ponack, L.L.P.

(57) ABSTRACT

A gas turbine combustor includes a plurality of narrowing parts that protrude toward the inside of a combustion liner. The center axis of the combustion liner includes an upstream center axis, which linearly extends in an upstream region of the combustion liner, and extends in an ejection part in a direction that is different from the extension direction of the upstream center axis. The combustion liner includes a first region and a second region, the first region and the second region being divided by a virtual plane which includes the center axis from the upstream region to the ejection part, and the virtual plane is orthogonal to a virtual flat plane that includes the center axis. A straight line obtained by extending the upstream center axis passes through the first region
(Continued)

in the ejection part. The total value of projected areas of the narrowing parts present in the second region as viewed from the extension direction of the center axis is larger than the total value of projected areas of the narrowing parts present in the first region as viewed from the extension direction of the center axis.

12 Claims, 17 Drawing Sheets

(51) Int. Cl.
*F23R 3/46* (2006.01)
*F23R 3/18* (2006.01)

(56) References Cited

U.S. PATENT DOCUMENTS

| | | | | |
|---|---|---|---|---|
| 2019/0113231 | A1* | 4/2019 | Kajimura | F23R 3/50 |
| 2019/0293292 | A1* | 9/2019 | Tamura | F23R 3/42 |
| 2023/0204212 | A1* | 6/2023 | Kim | F23R 3/045<br>60/39.23 |
| 2024/0027069 | A1 | 1/2024 | Fukuba et al. | |

FOREIGN PATENT DOCUMENTS

| | | |
|---|---|---|
| WO | 2011/058931 | 5/2011 |
| WO | 2016/047397 | 3/2016 |
| WO | 2021/201093 | 10/2021 |

OTHER PUBLICATIONS

Office Action issued May 27, 2025 in corresponding Japanese Patent Application No. 2024-507776, with machine translation.

* cited by examiner

GAS TURBINE COMBUSTOR AND GAS TURBINE

TECHNICAL FIELD

The present disclosure relates to a gas turbine combustor and a gas turbine.

The present application claims priority based on Japanese Patent Application No. 2022-039453 filed in Japan on Mar. 14, 2022, the contents of which are incorporated herein by reference.

BACKGROUND ART

A combustor used in a gas turbine includes, for example, a fuel nozzle capable of supplying fuel and a combustion liner in which a combustion region through which a combustion gas generated by combustion of the fuel can flow is formed inside. The fuel supplied from the fuel nozzle is converted into a fuel gas by combustion, and drives a turbine provided on a downstream side via a combustion region of the combustion liner.

In the combustor of this type of gas turbine, the temperature of the combustion gas in the vicinity of an inner wall surface of the combustion liner is lower than that in a central portion. Therefore, there is a case where the timing at which the carbon monoxide (CO) contained in the combustion gas chemically reacts with the carbon dioxide ($CO_2$) is delayed, and the generation of the carbon monoxide increases. Regarding these problems, PTL 1 discloses a method of providing a narrowing member on an inner wall surface of a combustion liner, which is provided in a combustor, to cause combustion gas in the vicinity of the inner wall surface to flow toward a central portion, thereby promoting combustion by mixing the combustion gas with a high temperature and suppressing the generation of carbon monoxide.

CITATION LIST

Patent Literature

[PTL 1] International Publication No. WO2011/058931

SUMMARY OF INVENTION

Technical Problem

During a partial load operation of the gas turbine in which the temperature of the combustion gas is relatively low, the amount of carbon monoxide contained in the combustion gas is larger than that during a rated operation. Therefore, it is difficult to lower the lower limit of the operating load of the gas turbine.

As a result of the present inventors having conducted intensive studies, it has been found that a deviation in the temperature of the combustion gas in a circumferential direction is generated due to the influence of the shape of the region on the downstream side in the combustion liner. Therefore, in order to suppress the generation of carbon monoxide, it is desirable to suppress the deviation of the temperature of the combustion gas.

An object of at least one embodiment of the present disclosure is to provide a gas turbine combustor and a gas turbine in which the generation of carbon monoxide can be suitably suppressed even during a partial load operation of a gas turbine in view of the above-described circumstances.

Solution to Problem (1) A gas turbine combustor according to at least one embodiment of the present disclosure includes: a combustion liner in which combustion region through which a combustion gas generated by combustion of a fuel is allowed to flow is formed on an inner side and that includes an ejection part that is formed at an end portion on a downstream side and that forms an ejection port for the combustion gas; and a plurality of narrowing parts that are provided on an inner wall surface of the combustion liner at intervals in a circumferential direction and that protrude toward the inner side of the combustion liner, in which a center axis of the combustion liner includes an upstream center axis extending in a linear shape in an upstream region of the combustion liner, and extends in a direction different from an extension direction of the upstream center axis in the ejection part, the combustion liner comprises a first region and a second region, the first region and the second region being divided by a virtual plane which includes the center axis extending from the upstream region to the ejection part, and the virtual plane is orthogonal to a virtual flat plane that includes the center axis, a straight line obtained by extending the upstream center axis passes through the first region in the ejection part, and a total value of projected areas of the narrowing parts present in the second region when viewed from an extension direction of the center axis is larger than a total value of projected areas of the narrowing parts present in the first region when viewed from the extension direction of the center axis.

(2) A gas turbine combustor according to at least one embodiment of the present disclosure includes: a combustion liner in which combustion region through which a combustion gas generated by combustion of a fuel is allowed to flow is formed on an inner side and that includes an ejection part that is formed at an end portion on a downstream side and that forms an ejection port for the combustion gas; and a plurality of narrowing parts that are provided on an inner wall surface of the combustion liner at intervals in a circumferential direction and that protrude toward the inner side of the combustion liner, in which a center axis of the combustion liner includes an upstream center axis extending in a linear shape in an upstream region of the combustion liner, and extends in a direction different from an extension direction of the upstream center axis in the ejection part, the combustion liner comprises a first region and a second region, the first region and the second region being divided by a virtual plane which includes the center axis extending from the upstream region to the ejection part, and the virtual plane is orthogonal to a virtual flat plane that includes the center axis, a distance traced along the inner wall surface in the virtual flat plane from a position corresponding to a reference position on the upstream center axis to the ejection port is shorter in the second region than in the first region, and a total value of projected areas of the narrowing parts present in the second region when viewed from an extension direction of the center axis is larger than a total value of projected areas of the narrowing parts present in the first region when viewed from the extension direction of the center axis.

(3) A gas turbine according to at least one embodiment of the present disclosure includes: a compressor that generates compressed air; the gas turbine combustor according to (1) or (2); and a turbine that is rotationally driven by combustion gas generated by the gas turbine combustor.

Advantageous Effects of Invention

According to at least one embodiment of the present disclosure, it is possible to provide a gas turbine combustor and a gas turbine in which the generation of carbon monoxide can be suitably suppressed even during a partial load operation of the gas turbine.

DESCRIPTION OF EMBODIMENTS

Figure 1:
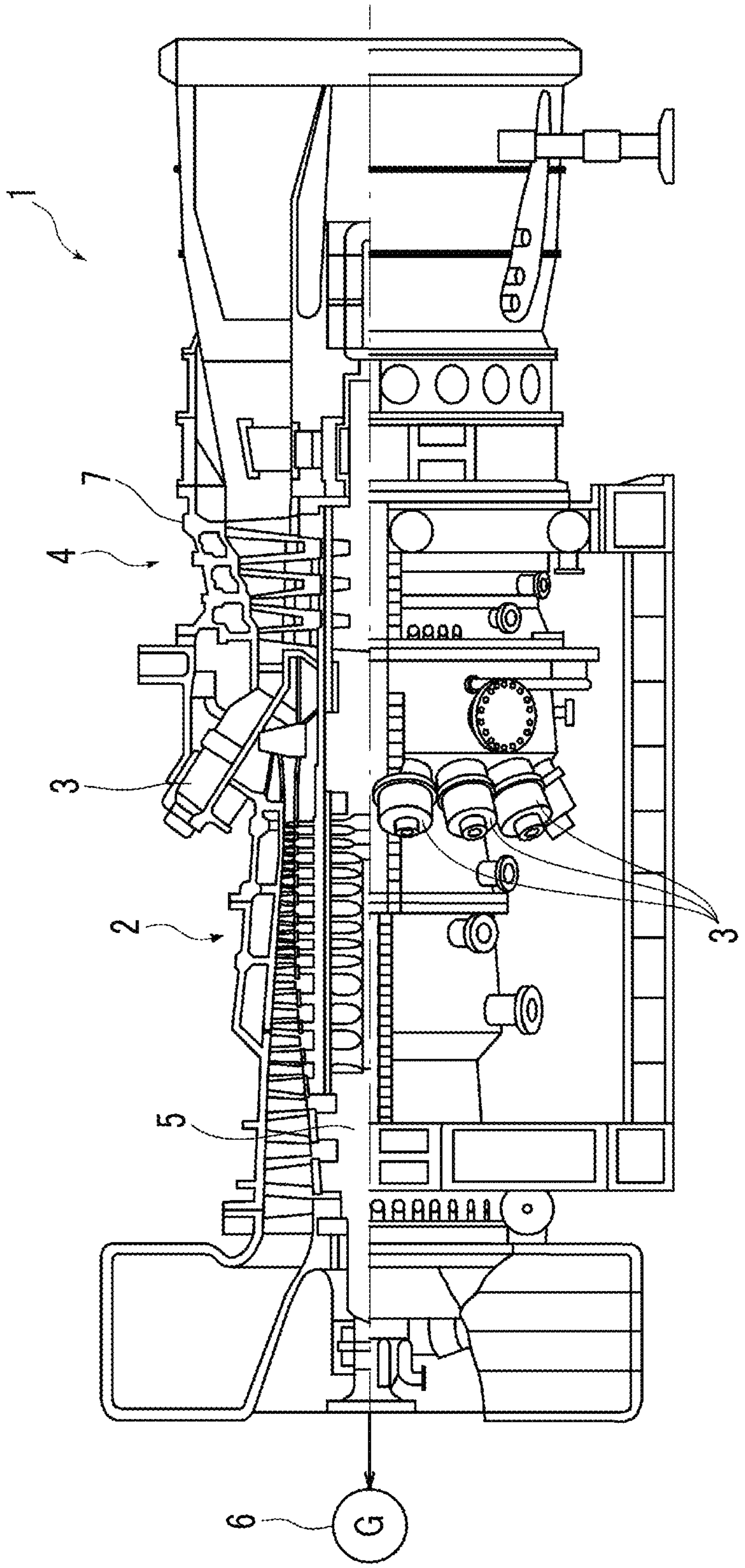
FIG. 1 is a diagram schematically showing a configuration of a gas turbine according to an embodiment of the present disclosure.

Hereinafter, some embodiments of the present disclosure will be described with reference to the accompanying drawings. However, dimensions, materials, shapes, and relative dispositions of components described as the embodiments or illustrated in the drawings are not intended to limit the scope of the present disclosure, and are merely examples for describing the present disclosure.

For example, expressions representing relative or absolute dispositions such as "in a certain direction", "along a certain direction", "parallel", "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an uneven portion or a chamfered portion within a range where the same effect can be obtained.

In addition, expressions of "being provided with", "being equipped with", "including", or "having" one component are not exclusive expressions excluding the presence of other components.

FIG. 1 is a diagram schematically showing a configuration of a gas turbine according to an embodiment of the present disclosure.

Figure 2:
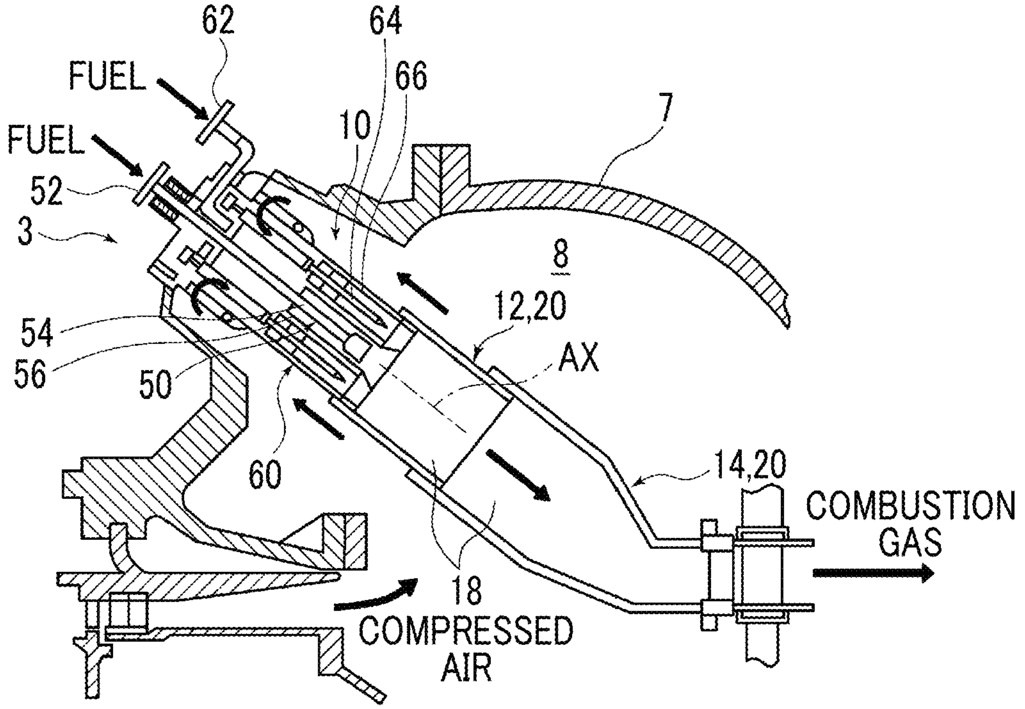
FIG. 2 is a view for describing a configuration around a combustor of the gas turbine.

FIG. 2 is a view for describing a configuration around a combustor of the gas turbine.

(Regarding Gas Turbine 1)

As shown in FIG. 1, a gas turbine 1 according to the present embodiment includes a compressor 2, a combustor (a gas turbine combustor) 3, and a turbine 4, and drives an external device such as a generator G. In a case of the gas turbine 1 for power generation, the generator G is connected to a rotor 5.

The compressor 2 sucks and compresses the atmosphere, which is the outside air, and supplies the compressed air to one or more combustors 3.

The combustor 3 generates high-temperature gas (combustion gas) by using air compressed by the compressor 2 to combust fuel supplied from the outside. In the gas turbine 1 according to the embodiment, a plurality of the combustors 3 are disposed in an annular shape around the rotor 5. In the gas turbine 1 according to the embodiment, an oil fuel (liquid fuel) which is a flammable liquid is used as fuel. However, a gaseous fuel which is a flammable gas may be used as fuel.

The turbine 4 receives the supply of the high-temperature combustion gas generated by the combustor 3 to generate a rotational driving force, and outputs the generated rotational driving force to the compressor 2 and the external device.

As shown in FIG. 2, a combustor installation space 8 of the combustor 3 is provided in a casing 7. The combustor installation space 8 is located between an outlet of the compressor 2 on an axial upstream side and an inlet of the turbine 4 on an axial downstream side. The combustor 3 is disposed in the combustor installation space 8, and compressed air flows into the combustor 3 from one end side of the combustor 3. Meanwhile, the combustor 3 is supplied with fuel from the outside, generates high-temperature combustion gas by mixing the fuel with air, and rotationally drives the turbine 4 on the downstream side with the combustion gas.

More specifically, the combustor 3 according to some embodiments includes a nozzle unit 10 and a combustion liner 20. The combustion liner 20 includes an inner cylinder 12 and a transition piece 14. The inner cylinder 12 and the transition piece 14 may be integrally formed. A combustion chamber 18 in which the fuel injected from a main nozzle 64 and a pilot nozzle 54 is combusted is provided at an inner side of the combustion liner 20. That is, the fuel is mixed with the compressed air supplied from the compressor 2 in a combustion region in the combustion liner 20, and then is combusted to generate the combustion gas. The combustion gas is supplied to the turbine 4 by the combustion liner 20.

The nozzle unit 10 includes a pilot burner 50 and a plurality of main burners (premixed combustion burners) 60.

The pilot burner 50 is disposed along a center axis AX of the combustion liner 20. The plurality of main burners 60 are arranged to be spaced apart from each other in the circumferential direction of the combustion liner 20 to surround the pilot burner 50.

The pilot burner 50 includes the pilot nozzle 54 connected to a fuel port 52, a pilot nozzle cylinder 56 disposed to surround the pilot nozzle 54, and a swirler (not shown) provided on an outer periphery of the pilot nozzle 54.

The main burner 60 includes the main nozzle 64 connected to the fuel port 62, a main nozzle cylinder 66 disposed to surround the main nozzle 64, and a swirler (not shown) provided on an outer periphery of the main nozzle 64.

In the combustor 3 having the above configuration, the compressed air generated by the compressor 2 is supplied into the combustor installation space 8, and further flows into the main nozzle cylinder 66 from the combustor installation space 8. Then, the compressed air and the fuel supplied from the fuel port 62 are premixed in the main nozzle cylinder 66. At this time, the premixed gas is mainly formed into a swirling flow by a swirler (not shown) and flows into the inner cylinder 12. In addition, the compressed air and the fuel jetted from the pilot burner 50 via the fuel port 52 are mixed, ignited, and combusted by a pilot fire (not shown), and the combustion gas is generated. At this time, a part of the combustion gas diffuses to the surroundings with the flame, and is ignited and combusted by the premixed gas flowing into the inner cylinder 12 from each main burner 60. That is, the flame holding for performing the stable combustion of the premixed gas (premixed fuel) from the main burner 60 can be performed by the pilot flame caused by the pilot fuel jetted from the pilot burner 50.

For convenience of description, expressions such as upstream, downstream, upstream side, and downstream side used in the following description are based on a flow direction of a combustion gas flowing inside the combustion liner 20. That is, a side where the fuel nozzle (pilot nozzle 54, main nozzle 64) is provided with reference to the combustion liner 20 is referred to as an upstream side, and a side where the combustion liner 20 is provided with reference to the fuel nozzle is referred to as a downstream side.

In addition, a direction along the center axis AX of the combustion cylinder 20 is also referred to as simply an axial direction, a circumferential direction around the center axis AX is also referred to as simply a circumferential direction, and a radial direction around the center axis AX is also referred to as simply a radial direction. Furthermore, the main flow of the combustion gas flowing inside the combustion liner 20 is appropriately referred to as a "main flow".

Figure 3A:
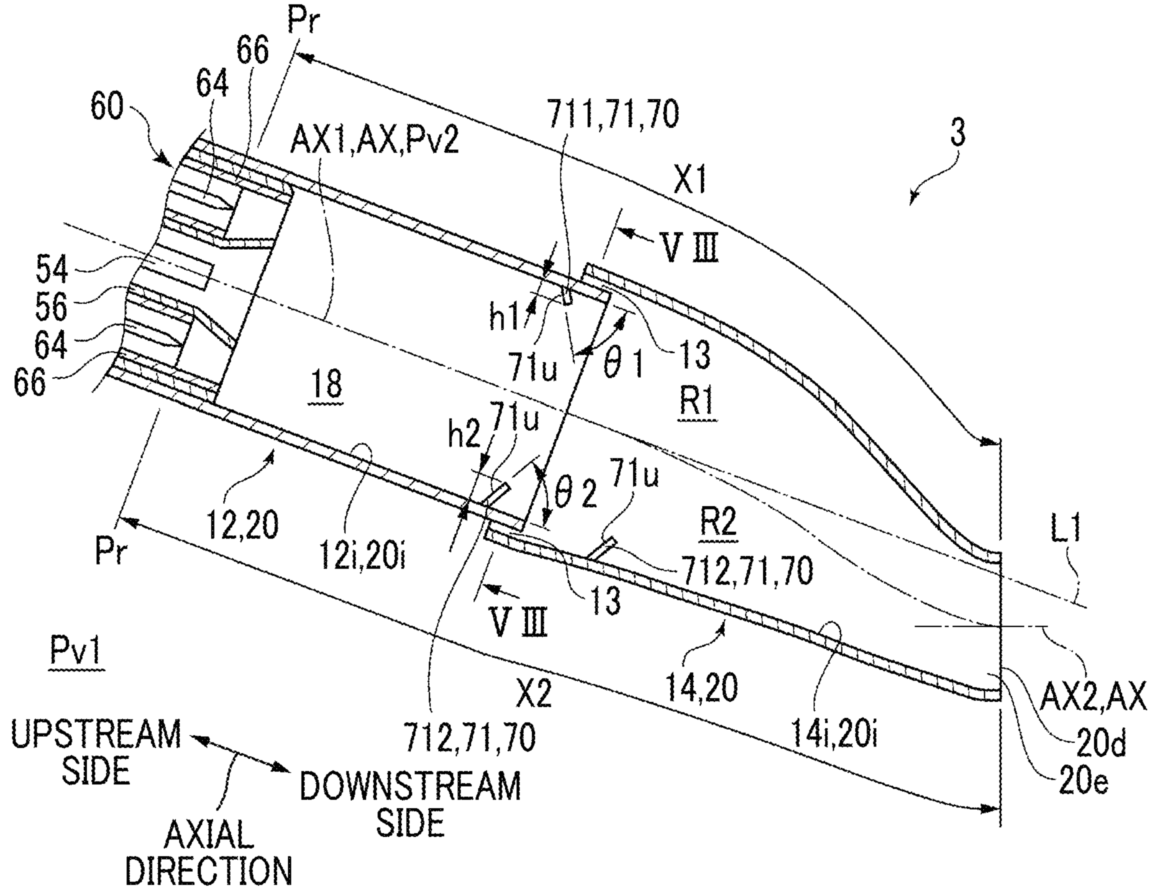
FIG. 3A is a cross-sectional view showing an example of a shape of a combustion liner.

FIG. 3A is a cross-sectional view showing an example of a shape of the combustion liner.

Figure 3B:
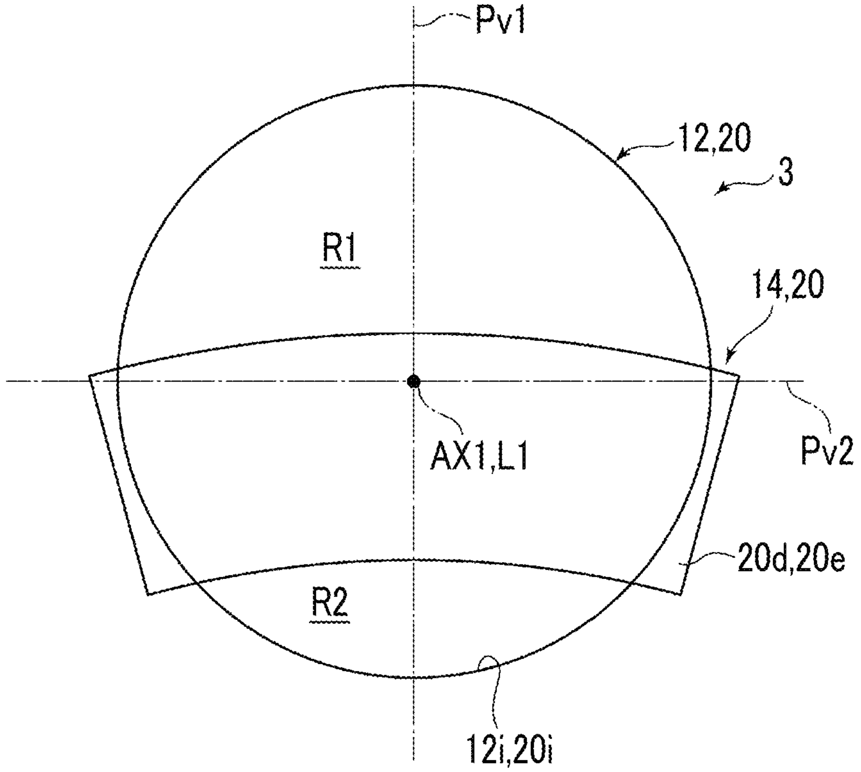
FIG. 3B is a schematic view showing a positional relationship between a shape of an inner wall surface on an upstream side of the combustion liner shown in FIG. 3A and a shape of an inner peripheral surface of an ejection port.

FIG. 3B is a schematic view showing a positional relationship between a shape of the inner wall surface on the upstream side of the combustion liner and a shape of the inner peripheral surface of an ejection port when the combustion liner shown in FIG. 3A is viewed from the downstream side along a first center axis on the upstream side of the combustion liner.

Figure 4A:
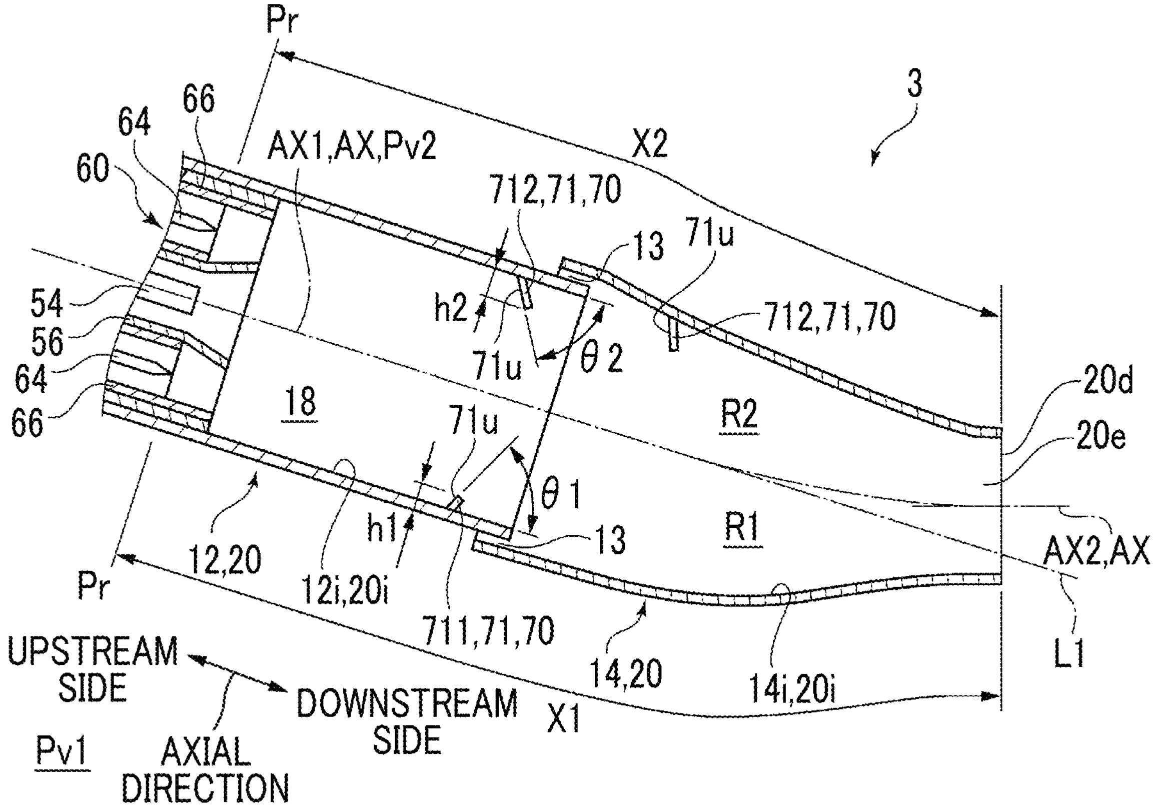
FIG. 4A is a cross-sectional view showing another example of the shape of the combustion liner.

FIG. 4A is a cross-sectional view showing another example of the shape of the combustion liner.

Figure 4B:
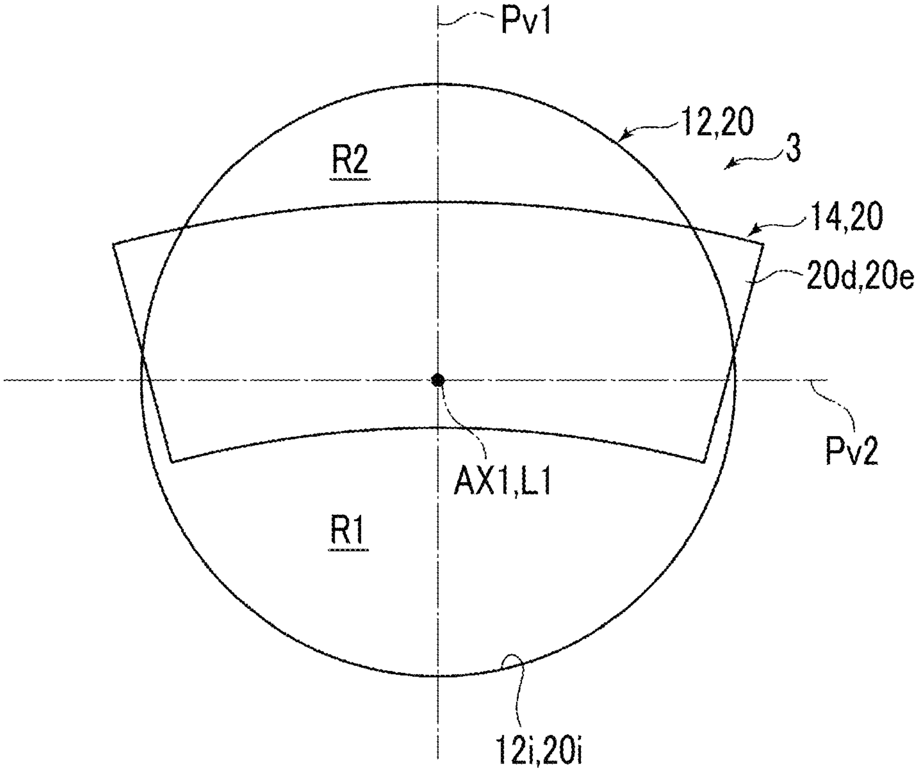
FIG. 4B is a schematic view showing a positional relationship between the shape of the inner wall surface on the upstream side of the combustion liner shown in FIG. 4A and the shape of the inner peripheral surface of the ejection port.

FIG. 4B is a schematic view showing a positional relationship between the shape of the inner wall surface on the upstream side of the combustion liner and the shape of the inner peripheral surface of the ejection port when the combustion liner shown in FIG. 4A is viewed from the downstream side along the first center axis on the upstream side of the combustion liner.

As shown in FIGS. 3A and 4A, in the combustor 3 according to some embodiments, the combustion liner 20 has an ejection part 20*e* that forms an ejection port 20*d* for jetting out the combustion gas, at an end portion on the downstream side. The center axis AX of the combustion liner 20 extends in different directions which are a first center axis AX1 on the upstream side of the combustion liner 20 and a second center axis AX2 in the ejection part 20*e*.

FIGS. 3A and 4A show cross sections that appear on a virtual flat plane Pv1 including the center axis AX from an upstream region of the combustion liner 20 to the ejection part 20*e*.

As shown in FIGS. 3A and 4A, in the combustor 3 according to some embodiments, the inner cylinder 12 has an inner wall surface 12*i* that is an inner peripheral surface of a cylinder extending linearly around the first center axis AX1.

As shown in FIGS. 3A and 4A, in the combustor 3 according to some embodiments, the transition piece 14 has a shape bent such that an extension direction of the center axis AX at least at a connecting portion with the inner cylinder 12 is different from an extension direction of the center axis AX (second center axis AX2) at the ejection part 20*e*. The transition piece 14 is formed such that the cross-sectional shape thereof orthogonal to the center axis AX gradually changes along the center axis AX from a circular shape at the connecting portion with the inner cylinder 12 to a partial annular shape at the ejection part 20*e*.

In addition, as shown in FIGS. 3A and 4A, in the combustor 3 according to some embodiments, the transition piece 14 changes to a flat shape such that a distance between the center axis AX and an inner wall surface 14*i* gradually decreases toward the downstream side in a cross section parallel to the virtual flat plane Pv1.

As shown in FIGS. 3A and 4A, in the combustor 3 according to some embodiments, the transition piece 14 includes a first region R1 and a second region R2 that are divided by a virtual plane Pv2 which includes the center axis AX extending from the upstream region to the ejection part 20*e*, and which is orthogonal to the virtual flat plane Pv1 described above. In addition, in FIGS. 3A and 4A, the virtual plane Pv2 is a plane orthogonal to a paper surface of FIGS. 3A and 4A, and includes the center axis AX extending from the upstream region to the ejection part 20*e*. That is, in FIGS. 3A and 4A, the center axis AX corresponds to the cross section of the virtual plane Pv2 shown on the paper surface of FIGS. 3A and 4A.

Here, the first region R1 is a region of two regions that are divided by the center axis AX in FIGS. 3A and 4A, which is a region where a straight line L1, which is the first center axis AX1 (upstream center axis) on the upstream side of the combustion liner 20 extending to the downstream side, passes in the ejection part 20*e* (refer to FIGS. 3B and 4B).

In addition, the first region R1 is a region of the two regions that are divided by the center axis AX in FIG. 3A and FIG. 4A, which is a region where a distance traced along an inner wall surface 20*i* from a position corresponding to a reference position Pr on the first center axis AX1 to the ejection port 20*d* is longer in the virtual flat plane Pv1.

That is, on the paper surface of FIGS. 3A and 4A, a distance X1 from a position corresponding to the inner wall surface 20*i* of the combustion liner 20 in the first region R1 shown in FIGS. 3A and 4A to the ejection port 20*d* is longer than a distance X2 from a position corresponding to the inner wall surface 20*i* of the combustion liner 20 in the second region R2 shown in FIGS. 3A and 4A to the ejection port 20*d*, the distances X1 and X2 being traced from the reference position Pr on the first center axis AX1.

The reference position Pr on the first center axis AX1 may be, for example, a tip position of the fuel nozzle (the pilot nozzle 54 and the main nozzle 64) on the first center axis AX1, or may be a position of an end portion on the upstream side or the downstream side of the inner cylinder 12.

In the combustor 3 shown in FIG. 3A, the first region R1 is a region on an upper side in the drawing with respect to the center axis AX, and the second region R2 is a region on a lower side in the drawing with respect to the center axis AX.

In the combustor 3 shown in FIG. 4A, the first region R1 is a region on a lower side in the drawing with respect to the center axis AX, and the second region R2 is a region on an upper side in the drawing with respect to the center axis AX.

As shown in FIGS. 3A and 4A, the combustor 3 according to some embodiments is provided with a plurality of narrowing parts 71 provided at intervals in the circumferential direction on the inner wall surface 20*i* of the combustion liner 20 and protruding toward a radial inner side of the combustion liner 20. The narrowing part 71 is for guiding the combustion gas having a relatively low temperature flowing in the vicinity of the inner wall surface 20*i* of the combustion liner 20 toward the central portion of the combustion liner 20. Accordingly, the combustion is promoted by the relatively low temperature combustion gas flowing in the vicinity of the inner wall surface 20*i* being mixed with the relatively high-temperature combustion gas flowing in a central portion of the combustion liner 20. The details of the narrowing part 71 will be described in detail later.

(Problems to Be Solved of Gas Turbine Combustor in Related Art)

In the gas turbine combustor in the related art, the temperature of the combustion gas in the vicinity of the inner wall surface of the combustion liner is lower than that in the central portion. Therefore, there is a case where the timing at which the carbon monoxide (CO) contained in the combustion gas chemically reacts with the carbon dioxide ($CO_2$) is delayed, and the generation of the carbon monoxide is increased. In particular, during the partial load operation of the gas turbine in which the temperature of the combustion gas is relatively low, the amount of carbon monoxide contained in the combustion gas is larger than that during the rated operation. Therefore, it is difficult to lower the lower limit of the operating load of the gas turbine.

As a result of the present inventors having conducted intensive studies, it has been found that a deviation in the temperature of the combustion gas in a circumferential direction is generated due to the influence of the shape of the region on the downstream side in the combustion liner.

Specifically, in a case where the narrowing part 71 to be described in detail later is not provided, it was found that in a region on the relatively downstream side in the transition piece 14, the temperature of the combustion gas tends to be lower in the second region R2 than in the first region R1 in a region on a relatively radial outer side.

Therefore, in the combustor 3 according to some embodiments, as will be described in detail later, a total value S2 of a projected area of the narrowing part 71 present in the second region R2 when viewed from the extension direction of the center axis AX is set to be larger than a total value S1 of a projected area of the narrowing part 71 present in the first region R1 when viewed from the extension direction of the center axis AX.

In this manner, the total value S2 of the projected areas of the narrowing parts 71 present in the second region R2 when viewed from the extension direction of the center axis AX is set to be larger than the total value S1 of the projected areas of the narrowing parts 71 present in the first region R1 when viewed from the extension direction of the center axis AX. In this manner, the combustion gas flowing in the vicinity of the inner wall surface 20*i* of the combustion liner 20 is more easily guided toward the central portion of the combustion liner 20 in the second region R2 than in the first region R1. Accordingly, the combustion can be further promoted by mixing the combustion gas having a relatively low temperature in the second region R2 with the high-temperature combustion gas. Therefore, the difference between the temperature of the combustion gas in the second region R2 and the temperature of the combustion gas in the first region R1 can be suppressed, and the generation of carbon monoxide can be suitably suppressed even during the partial load operation of the gas turbine 1.

In addition, according to the gas turbine 1 including the combustor 3 according to some embodiments, the combustion can be further promoted by mixing the combustion gas having a relatively low temperature in the second region R2 with the high-temperature combustion gas. Therefore, the difference between the temperature of the combustion gas in the second region R2 and the temperature of the combustion gas in the first region R1 can be suppressed, and the generation of carbon monoxide can be suitably suppressed even during the partial load operation of the gas turbine 1.

The respective projected areas of the narrowing parts 71 when viewed from the extension direction of the center axis AX are the projected areas of the narrowing parts 71 when viewed from the direction of the tangent to the center axis AX at the position on the center axis AX that is the position closest to each of the narrowing parts 71, which is the position on the center axis AX.

In the following description, the projected area of the narrowing part 71 when viewed from the extension direction of the center axis AX is also simply referred to as a projected area.

(Details of Narrowing Part 71)

Figure 5:
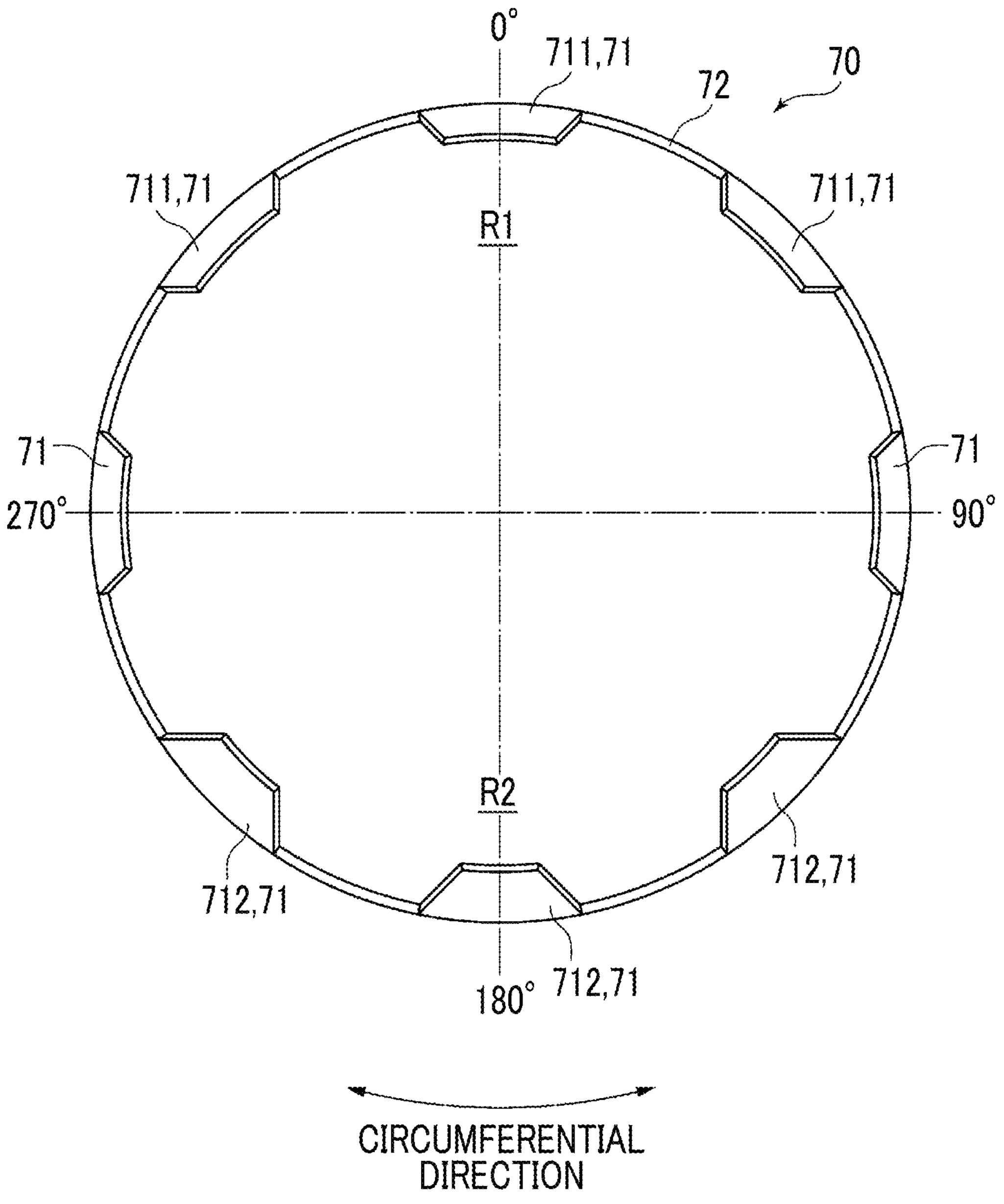
FIG. 5 is a view of an example of a narrowing member according to some embodiments including a narrowing part, when viewed from an axial downstream side.
Figure 6:
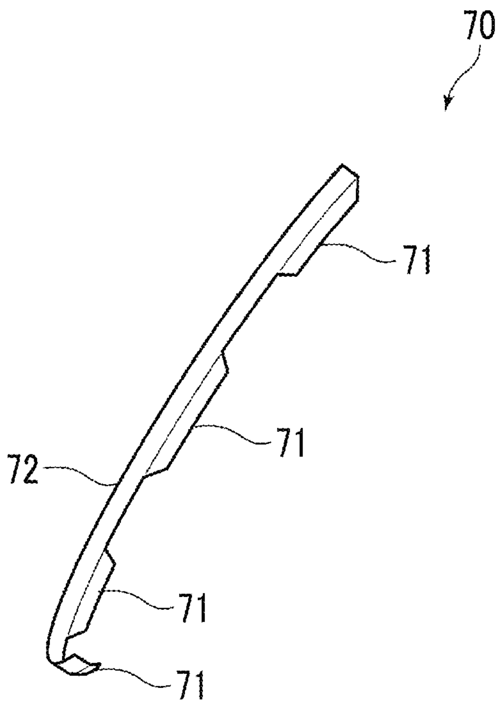
FIG. 6 is a perspective view of a portion of the narrowing member shown in FIG. 5.

FIG. 5 is a view of an example of a narrowing member 70 according to some embodiments including the narrowing part 71 as seen from the axial downstream side. FIG. 6 is a perspective view of a part of the narrowing member 70 shown in FIG. 5.

As shown in FIGS. 5 and 6, the narrowing member 70 according to some embodiments includes an annular ring portion 72 and the narrowing part 71 that is a plurality of protruding portions formed at intervals in the circumferential direction on the ring portion 72. In the narrowing member 70 according to some embodiments, the narrowing part 71 has a shape in which a protruding portion protruding in the axial direction with respect to the ring portion 72 is bent toward the radial inner side.

In FIG. 5, when the narrowing member 70 is attached to the combustion liner 20, two intersection positions between the narrowing member 70 and the above-described virtual flat plane Pv1 are set as angle positions of 0 degrees and 180 degrees in the circumferential direction. Then, the angle position present in the first region R1, which is at the intersection position with the virtual flat plane Pv1, is set to 0 degrees, and the angle position in the second region R2 is set to 180 degrees.

Figure 7A:
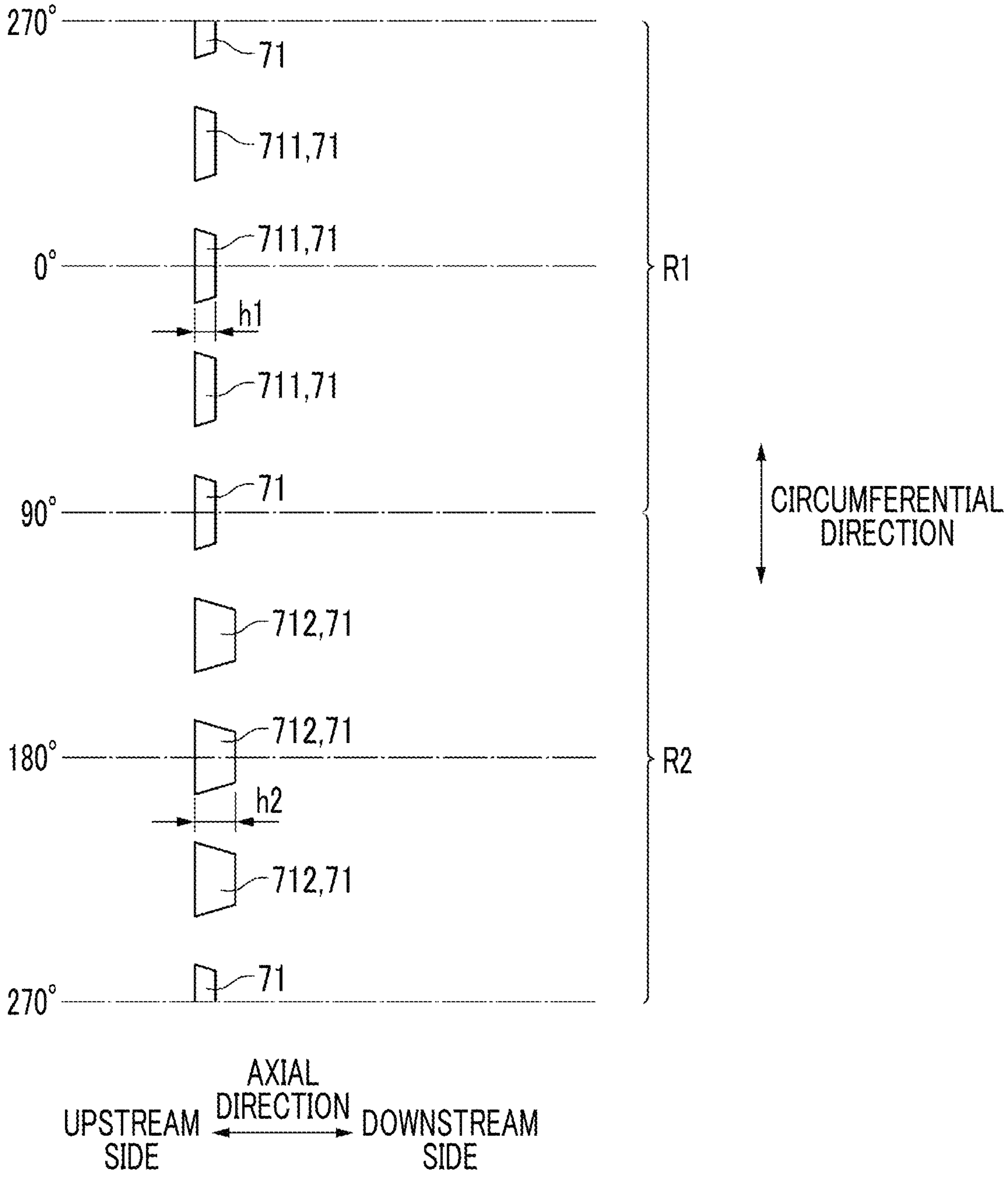
FIG. 7A is a schematic view in which the combustion liner is developed in a circumferential direction to show an example of a disposition position of the narrowing part.

FIG. 7A is a schematic view in which the combustion liner 20 is developed in the circumferential direction to show an example of a disposition position of the narrowing part 71, and shows the disposition of the narrowing part 71 of the narrowing member 70 shown in FIG. 5.

Figure 7B:
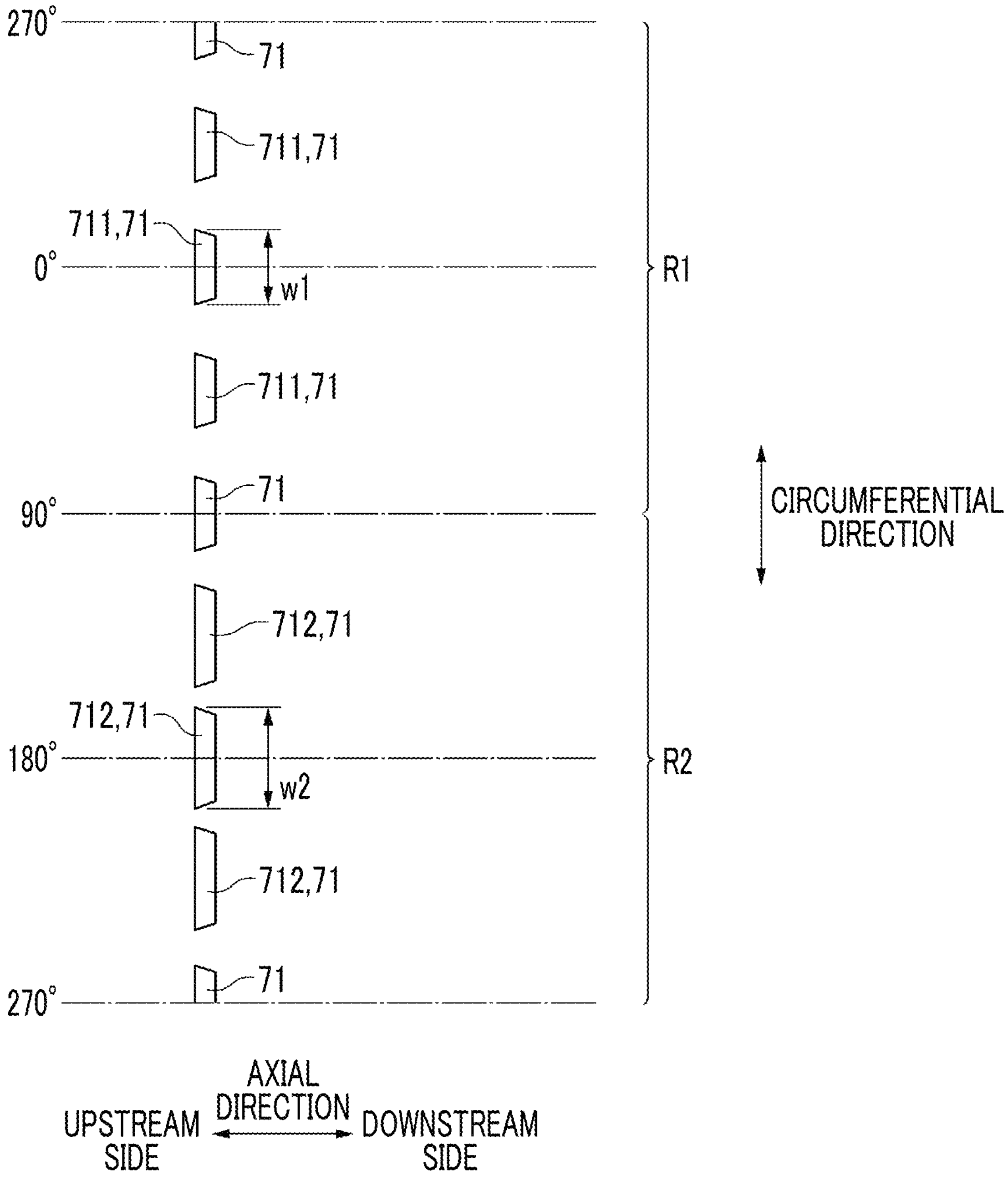
FIG. 7B is a schematic view in which the combustion liner is developed in the circumferential direction to show another example of the disposition position of the narrowing part.

FIG. 7B is a schematic view in which the combustion liner 20 is developed in the circumferential direction to show another example of the disposition position of the narrowing part 71.

Figure 7C:
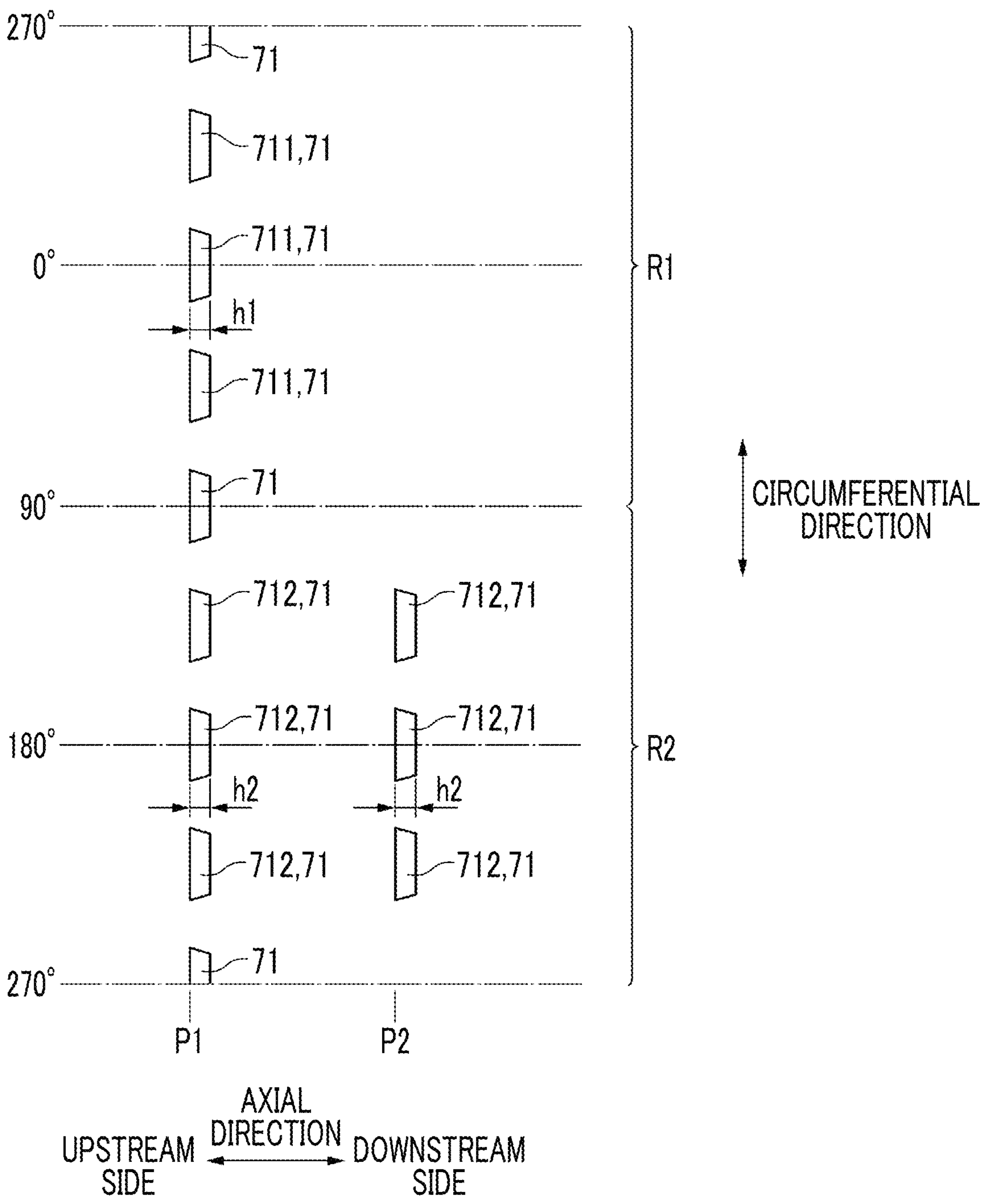
FIG. 7C is a schematic view in which the combustion liner is developed in the circumferential direction to show still another example of the disposition position of the narrowing part.

FIG. 7C is a schematic view in which the combustion liner 20 is developed in the circumferential direction to show still another example of the disposition position of the narrowing part 71.

Figure 7D:
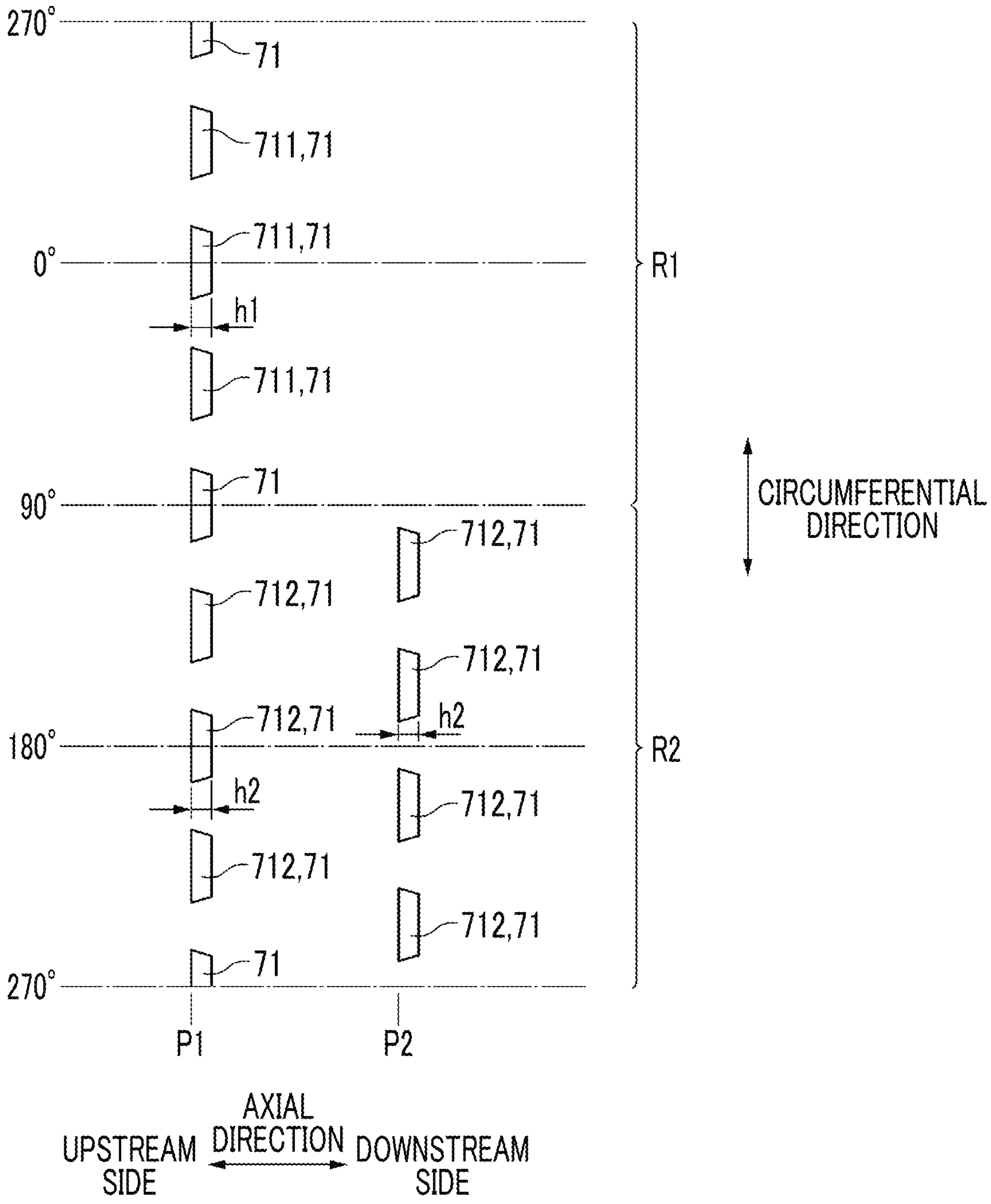
FIG. 7D is a schematic view in which the combustion liner is developed in the circumferential direction to show still another example of the disposition position of the narrowing part.

FIG. 7D is a schematic view in which the combustion liner 20 is developed in the circumferential direction to show still another example of the disposition position of the narrowing part 71.

Figure 7E:
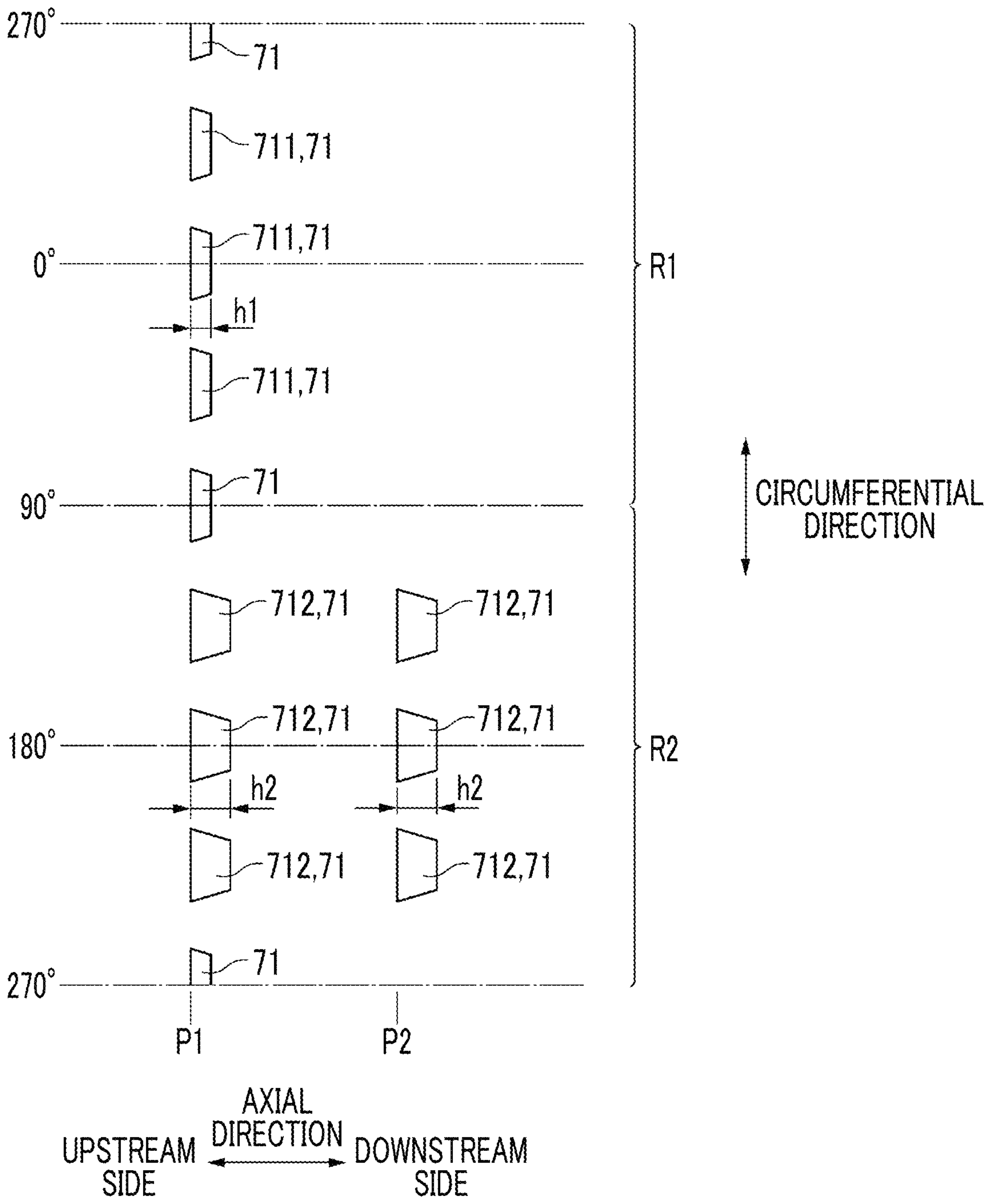
FIG. 7E is a schematic view in which the combustion liner is developed in the circumferential direction to show still another example of the disposition position of the narrowing part.

FIG. 7E is a schematic view in which the combustion liner 20 is developed in the circumferential direction to show still another example of the disposition position of the narrowing part 71.

Figure 7F:
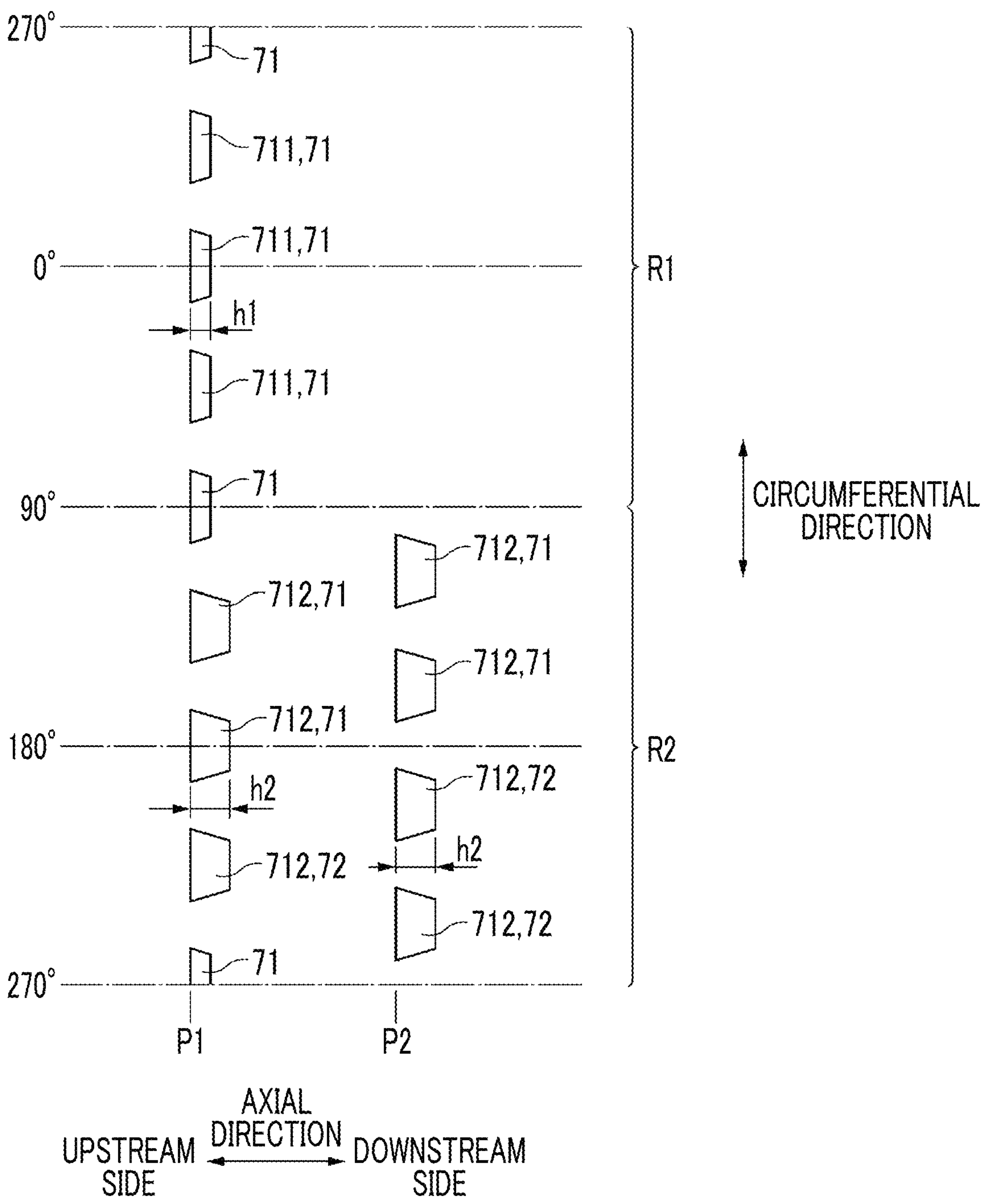
FIG. 7F is a schematic view in which the combustion liner is developed in the circumferential direction to show still another example of the disposition position of the narrowing part.

FIG. 7F is a schematic view in which the combustion liner 20 is developed in the circumferential direction to show still another example of the disposition position of the narrowing part 71.

FIGS. 7A to 7F show the relative positions at which the narrowing parts 71 are disposed in the axial direction and the circumferential direction and heights of the narrowing parts 71, that is, protrusion heights h1 and h2 from the inner wall surface 20*i* of the combustion liner 20 to the radial inner side (refer to FIGS. 3A and 4A).

In FIGS. 7A to 7F, a position of a left end of the narrowing part 71 in the shown right-left direction represents a position of the narrowing part 71 in the axial direction, and widths of the narrowing parts 71 in the shown right-left direction represent the protrusion heights h1 and h2 of the narrowing part 71 (refer to FIGS. 3A and 4A).

In the examples shown in FIGS. 7A to 7F, in any of the examples, the total value S2 of the projected areas of the narrowing parts 71 present in the second region R2 is set to be larger than the total value S1 of the projected areas of the narrowing parts 71 present in the first region R1.

For example, in the example shown in FIG. 7A, the number of the narrowing parts 71 (hereinafter, also referred to as a first narrowing part 711) disposed in the first region R1 and the number of the narrowing parts 71 (hereinafter, also referred to as a second narrowing part 712) disposed in the second region R2 are the same. However, each of the narrowing parts 71 is formed such that the protrusion height h2 of the second narrowing part 712 is higher than the protrusion height h1 of the first narrowing part 711.

For example, in the example shown in FIG. 7B, the number of the first narrowing parts 711 and the number of the second narrowing parts 712 are the same. However, each of the narrowing parts 71 is formed such that a width w2 of the second narrowing part 712 in the circumferential direction is larger than a width w1 of the first narrowing part 711 in the circumferential direction.

For example, in the example shown in FIGS. 7C and 7D, the projected areas of the first narrowing part 711 and the projected areas of the second narrowing part 712 are the same. However, in the second region, the second narrowing part 712 is further disposed at a position different in the axial direction, and thereby the total value S2 of the projected areas of the narrowing parts 71 present in the second region R2 is configured to be larger than the total value S1 of the projected areas of the narrowing parts 71 present in the first region R1.

In the example shown in FIG. 7C, the second narrowing part 712 disposed on the axial upstream side and the second narrowing part 712 disposed on the axial downstream side are disposed at the same position in the circumferential direction.

In addition, in the example shown in FIG. 7D, the second narrowing part 712 disposed on the axial upstream side and the second narrowing part 712 disposed on the axial downstream side are disposed at different positions in the circumferential direction.

For example, in the example shown in FIGS. 7E and 7F, each of the narrowing parts 71 is formed such that the protrusion height h2 of the second narrowing part 712 is higher than the protrusion height h1 of the first narrowing part 711. In addition, in the example shown in FIGS. 7E and 7F, in the second region, the second narrowing part 712 is further disposed at a different position in the axial direction.

In the example shown in FIG. 7E, the second narrowing part 712 disposed on the axial upstream side and the second narrowing part 712 disposed on the axial downstream side are disposed at the same position in the circumferential direction.

In addition, in the example shown in FIG. 7F, the second narrowing part 712 disposed on the axial upstream side and the second narrowing part 712 disposed on the axial downstream side are disposed at different positions in the circumferential direction.

For example, in the example shown in FIGS. 7C to 7F, the second narrowing part 712 on the axial upstream side may be disposed in the inner cylinder 12, and the second narrowing part 712 on the axial downstream side may be disposed in the transition piece 14 (refer to FIGS. 3A and 4A).

As described above, in the combustor 3 according to some embodiments, for example, as shown in FIGS. 7A, 7E, and 7F, the height (protrusion height h2) of at least one of the second narrowing parts 712 in the radial direction of the combustion liner 20 may be higher than the height (protrusion height h1) of the first narrowing part 711 in the radial direction.

Accordingly, the combustion gas flowing in the vicinity of the inner wall surface 20*i* of the combustion liner 20 in the second region R2 is easily guided toward the central portion of the combustion liner 20, and is easily mixed with the high-temperature combustion gas to promote combustion.

In the combustor 3 according to some embodiments, for example, in the examples shown in FIGS. 7A, 7E, and 7F, the protrusion height h2 of at least one of the second narrowing parts 712 may be 1.5 times or more and 3.0 times or less the protrusion height h1 of the first narrowing part 711.

The higher the protrusion height h2 of the second narrowing part 712 is, the more easily the combustion gas flowing in the vicinity of the inner wall surface 20*i* of the combustion liner 20 is guided toward the central portion of the combustion liner 20. However, there is a concern that the flow of the main flow of the combustion gas may be disturbed and the combustion efficiency may be adversely affected.

In the example shown in FIGS. 7A, 7E, and 7F, by setting the protrusion height h2 of at least one of the second narrowing parts 712 to be 1.5 times or more and 3.0 times or less the protrusion height h1 of the first narrowing part 711, the combustion gas flowing in the vicinity of the inner wall surface 20*i* of the combustion liner 20 in the second region R2 can be guided toward the central portion of the combustion liner 20 and can be mixed with the high-temperature combustion gas to promote the combustion while suppressing the influence on the flow of the main flow of the combustion gas.

In the combustor 3 according to some embodiments, for example, as shown in FIG. 7B, the width w2 of at least one of the second narrowing parts 712 in the circumferential direction may be larger than the width w1 of the first narrowing part 711 in the circumferential direction.

Accordingly, the combustion gas flowing in the vicinity of the inner wall surface 20*i* of the combustion liner 20 in the second region R2 is easily guided toward the central portion of the combustion liner 20, and is easily mixed with the high-temperature combustion gas to promote combustion.

In the combustor 3 according to some embodiments, as shown in FIGS. 3A and 4A, the surface on the upstream side of the narrowing part 71 may be an inclined surface 71*u* that is inclined to approach the center axis AX toward the downstream side of the combustion liner 20. An angle θ2 at which the inclined surface 71*u* of at least one of the second narrowing parts 712 is inclined with respect to the inner wall surface 20*i* may be larger than an angle θ1 at which the inclined surface 71*u* of the first narrowing part 711 is inclined with respect to the inner wall surface 20*i*.

As the angle at which the inclined surface 71*u* is inclined with respect to the inner wall surface 20*i* becomes larger, the combustion gas flowing in the vicinity of the inner wall surface 20*i* of the combustion liner 20 is more easily guided toward the central portion of the combustion liner 20.

By making the angle θ2 at which the inclined surface 71*u* of at least one of the second narrowing parts 712 is inclined with respect to the inner wall surface 20*i* greater than the angle θ1 at which the inclined surface 71*u* of the first narrowing part 711 is inclined with respect to the inner wall surface 20*i*, the combustion gas flowing in the vicinity of the inner wall surface 20*i* of the combustion liner 20 in the second region R2 is more easily guided toward the central portion of the combustion liner 20, and is more easily mixed with the high-temperature combustion gas to promote combustion.

In the combustor 3 according to some embodiments, the angle θ2 at which the inclined surface 71*u* for at least one of the second narrowing parts 712 is inclined with respect to the inner wall surface 20*i* may be 50 degrees or more and 85 degrees or less.

As the angle at which the inclined surface 71*u* is inclined with respect to the inner wall surface 20*i* becomes larger, the combustion gas flowing in the vicinity of the inner wall surface 20*i* of the combustion liner 20 is more easily guided toward the central portion of the combustion liner 20. However, there is a concern that the flow of the main flow of the combustion gas may be disturbed and the combustion efficiency may be adversely affected.

By setting the angle θ2 at which the inclined surface 71*u* of at least one of the second narrowing parts 712 is inclined with respect to the inner wall surface 20*i* to 50 degrees or more and 85 degrees or less, the combustion gas flowing in the vicinity of the inner wall surface 20*i* of the combustion liner 20 in the second region R2 can be guided toward the central portion of the combustion liner 20 and can be mixed with the high-temperature combustion gas to promote combustion while suppressing the influence on the flow of the main flow of the combustion gas.

Figure 8:
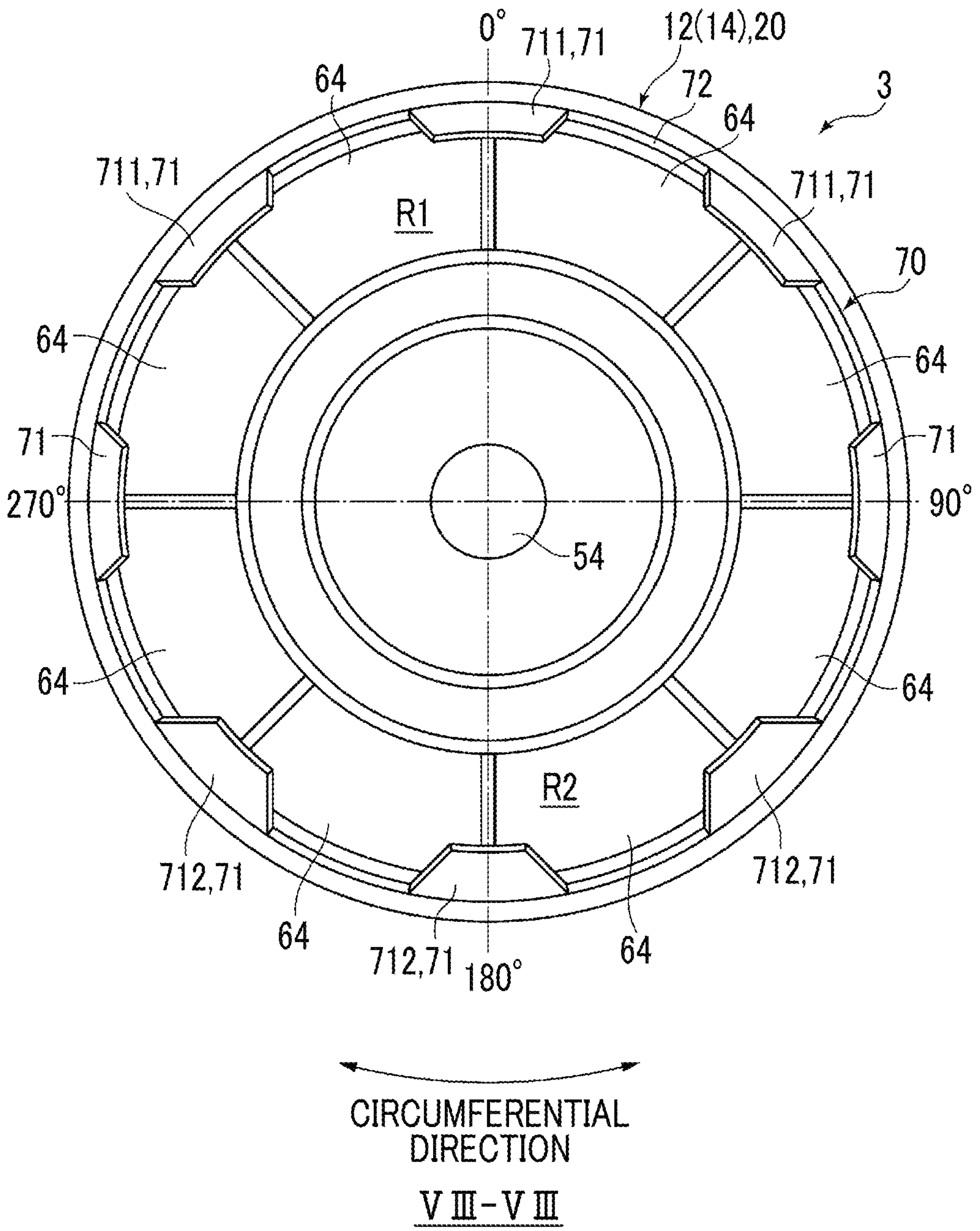
FIG. 8 is a view taken along line VIII-VIII of FIG. 3A.

FIG. 8 is a view taken along line VIII-VIII of FIG. 3A, and the description of the transition piece 14 is omitted.

The combustor 3 according to some embodiments includes, for example, a plurality of main nozzles 64 disposed at intervals in the circumferential direction in the combustion liner 20 (inner cylinder 12), as shown in FIG. 8. At least one of the narrowing parts 71 may be located between the two main nozzles 64 adjacent to each other in the circumferential direction when viewed from the extension direction of the center axis AX.

In a region between the two main nozzles 64 adjacent to each other in the circumferential direction when viewed from the extension direction of the center axis AX, the temperature of the combustion gas tends to be lower than that in a region overlapping the main nozzle 64 when viewed from the extension direction of the center axis AX.

By disposing at least one of the narrowing parts 71 to be located between the two main nozzles 64 adjacent to each other in the circumferential direction when viewed from the extension direction of the center axis AX, the combustion gas flowing in the vicinity of the inner wall surface 20*i* of the combustion liner 20 at a position where the temperature of the combustion gas tends to be low when viewed from the extension direction of the center axis AX can be guided toward the central portion of the combustion liner 20, and can be mixed with the high-temperature combustion gas to promote combustion.

In the combustor 3 according to some embodiments, for example, as shown in FIGS. 3A, 4A, and 7C to 7F, the second narrowing part 712 may be provided at a first position P1 along the center axis AX and at a second position P2 along the center axis AX which is different from the first position P1 (downstream side of the first position P1).

Accordingly, the combustion gas flowing in the vicinity of the inner wall surface 20*i* of the combustion liner 20 can be guided toward the central portion of the combustion liner 20 by the second narrowing part 712 provided at the first position P1 and the second position P2. Therefore, the combustion can be further promoted by mixing the combustion gas flowing in the vicinity of the inner wall surface 20*i* of the combustion liner 20 in the second region R2 with a larger amount of the high-temperature combustion gas.

In the combustor 3 according to some embodiments, for example, as shown in FIGS. 3A and 4A, the combustion liner 20 may include the inner cylinder 12 and the transition piece 14 disposed on the downstream side of the inner cylinder 12. The first position P1 may be a position inside the inner cylinder 12. The second position P2 may be a position inside the transition piece 14.

In the combustor 3 according to some embodiments, for example, as shown in FIGS. 3A and 4A, a gap 13 is formed in a connecting portion between the inner cylinder 12 and the transition piece 14, and is configured such that the compressed air is introduced into the combustion liner 20 as cooling air from the gap 13. Therefore, a decrease in the temperature of the combustion gas can be suppressed in the region on the downstream side of the second position P2 by providing the narrowing part 71 (the second narrowing part 712) on the inner wall surface 14*i* of the transition piece 14.

In the combustor 3 according to some embodiments, for example, as shown in FIGS. 7D and 7F, the second narrowing part 712 provided at the second position P2 may have a disposition position in the circumferential direction different from that of the second narrowing part 712 provided at the first position P1.

As a result of the present inventors having conducted intensive studies, it has been found that when the second narrowing part 712 provided at the second position P2 is different from the second narrowing part 712 provided at the first position P1 in a disposition position in the circumferential direction, the effect of guiding the combustion gas by means of the second narrowing part 712 provided at the second position P2 is enhanced as compared with a case where the second narrowing part 712 provided at the first position P1 and the second narrowing part 712 provided at the second position P2 are disposed at the same disposition position in the circumferential direction.

By making the disposition position of the second narrowing part 712 provided at the second position P2 in the circumferential direction to be different from the disposition position of the second narrowing part 712 provided at the first position P1, the effect of guiding the combustion gas by means of the second narrowing part 712 provided at the second position P2 can be enhanced.

(Cooling of Narrowing Part 71)

Figure 9:
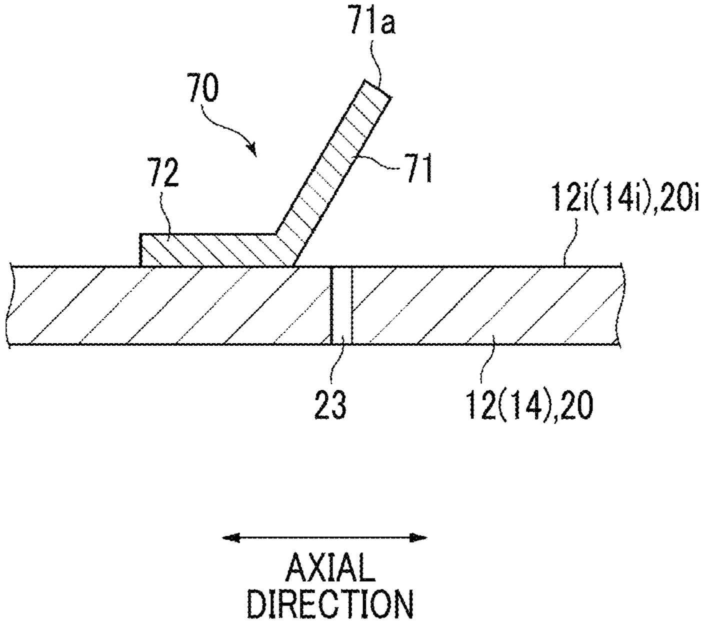
FIG. 9 is a view for showing an example of a configuration for cooling the narrowing part.

FIG. 9 is a view for showing an example of a configuration for cooling the narrowing part 71, and is a schematic cross-sectional view of the vicinity of the narrowing part 71 as seen in the circumferential direction.

In the combustor 3 according to some embodiments, the combustion liner 20 may have a through-hole 23 that is open at a position overlapping the narrowing part 71, that is, at a position overlapping the narrowing part 71 in the axial direction, when viewed from the center axis AX toward the radial outer side.

Accordingly, the air (compressed air) flowing on the outer side of the combustion liner 20 can flow toward the narrowing part 71 via the through-hole 23, and the narrowing part 71 exposed to the high-temperature combustion gas can be cooled.

The through-holes 23 may be provided to correspond to all the narrowing parts 71, or may be provided to correspond only to the second narrowing parts 712 in which the projected area of each of the second narrowing parts 712 is larger than that of the first narrowing part 711.

(Variation in Shape of Narrowing Part 71)

Figure 10A:
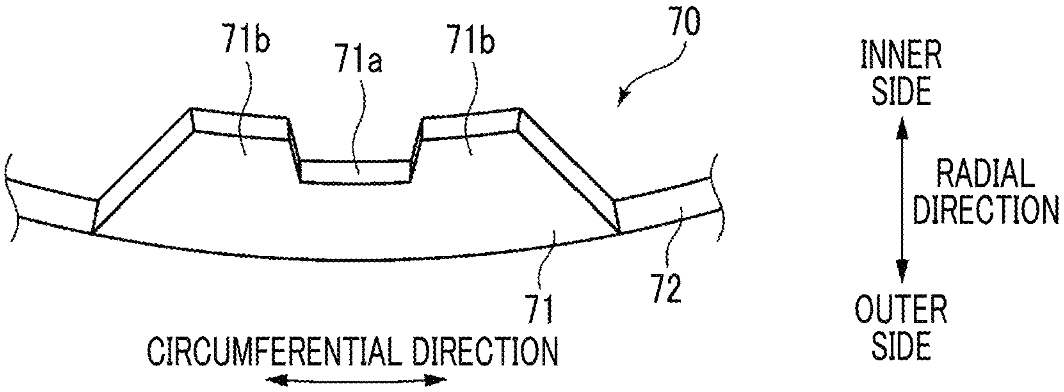
FIG. 10A is a view for describing a variation in the shape of the narrowing part.
Figure 10B:
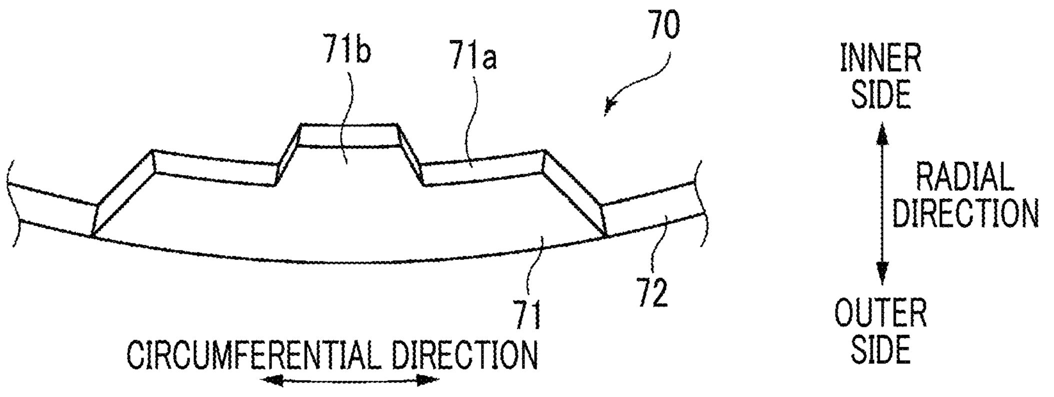
FIG. 10B is a view for describing a variation in the shape of the narrowing part.
Figure 10C:
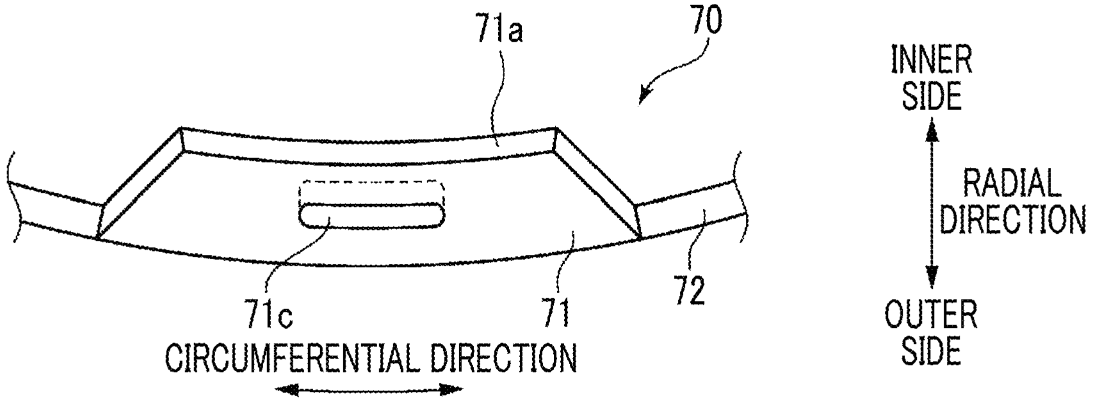
FIG. 10C is a view for describing a variation in the shape of the narrowing part.

FIGS. 10A, 10B, and 10C are views for describing variations in the shape of the narrowing part 71, and are views schematically showing the shape of the narrowing part 71 when viewed from the axial direction.

For example, as shown in FIGS. 10A and 10B, a protruding portion 71*b* that further protrudes to the radial inner side may be provided at an end portion 71*a* on the radial inner side of the narrowing part 71. The protruding portion 71*b* may be provided at one location as shown in FIG. 10A, or may be provided at a plurality of locations (two locations in the example shown in FIG. 10B) at an interval in the circumferential direction as shown in FIG. 10B.

As described above, by providing the protruding portion 71*b* that further protrudes to the radial inner side at the end portion 71*a* on the radial inner side of the narrowing part 71, the number of vortices of the combustion gas generated by guiding the combustion gas flowing in the vicinity of the inner wall surface 20*i* of the combustion liner 20 toward the central portion of the combustion liner 20 can be increased, and the combustion gas flowing in the vicinity of the inner wall surface 20*i* of the combustion liner 20 can be more easily mixed with the high-temperature combustion gas and combustion can be promoted.

In addition, for example, as shown in FIG. 10C, a through-hole 71*c* penetrating in the axial direction may be provided in the narrowing part 71. Accordingly, a pressure loss of the combustion gas can be suppressed. In addition, since the effects of guiding the combustion gas flowing in the vicinity of the inner wall surface 20*i* of the combustion liner 20 toward the central portion of the combustion liner 20 are different between the region where the through-hole 71*c* is provided and the region where the through-hole 71*c* is not provided in the circumferential direction, the number of vortices of the combustion gas generated by guiding the combustion gas flowing in the vicinity of the inner wall surface 20*i* of the combustion liner 20 toward the central portion of the combustion liner 20 can be increased, and the combustion gas flowing in the vicinity of the inner wall surface 20*i* of the combustion liner 20 can be more easily mixed with the high-temperature combustion gas and combustion can be promoted.

The present disclosure is not limited to the above-described embodiments, and also includes a form in which modifications are added to the above-described embodiments or a form in which the embodiments are combined with each other as appropriate.

For example, regarding variations in the shape and disposition of the narrowing part 71 shown in FIGS. 7A to 7F, the narrowing part 71 disposed in the second region R2 may be appropriately combined such that the total value S2 of the projected areas of the narrowing parts 71 present in the second region R2 is greater than the total value S1 of the projected areas of the narrowing parts 71 present in the first region R1.

In addition, for example, as shown in FIGS. 3A, 4A, and 7C to 7F, although two rows of the second narrowing parts 712 are provided in the axial direction, three or more rows may be provided.

For example, contents described in each of the above-described embodiments are understood as follows.

(1) A gas turbine combustor (combustor 3) according to at least one embodiment of the present disclosure includes a combustion liner 20 in which a combustion region through which combustion gas generated by combustion of a fuel is allowed to flow is formed on an inner side and that includes an ejection part 20*e* that is formed at an end portion on a downstream side and that forms an ejection port 20*d* for the combustion gas; and a plurality of narrowing parts 71 that are provided on an inner wall surface 20*i* of the combustion liner 20 at intervals in a circumferential direction and that protrude toward the inner side of the combustion liner 20. A center axis AX of the combustion liner 20 includes an upstream center axis (first center axis AX1) extending in a linear shape in an upstream region of the combustion liner 20, and extends in a direction different from an extension direction of the upstream center axis (first center axis AX1) in the ejection part 20*e*. The combustion liner 20 comprises a first region R1 and a second region R2, the first region R1 and the second region R2 being divided by a virtual plane Pv2 which includes the center axis AX extending from the upstream region to the ejection part 20*e*, and the virtual plane Pv2 is orthogonal to a virtual flat plane Pv1 that includes the center axis AX. A straight line L1 obtained by extending the upstream center axis (first center axis AX1) passes through the first region R1 in the ejection part 20*e*. A total value S2 of projected areas of the narrowing parts 71 (second narrowing parts 712) present in the second region R2 when viewed from the extension direction of the center axis AX is larger than a total value S1 of projected areas of the narrowing parts 71 (first narrowing parts 711) present in the first region R1 when viewed from the extension direction of the center axis AX.

According to the configuration of (1), the total value S2 of the projected areas of the narrowing parts 71 (second narrowing parts 712) present in the second region R2 when viewed from the extension direction of the center axis AX is set to be larger than the total value S1 of the projected areas of the narrowing parts 71 (first narrowing parts 711) present in the first region R1 when viewed from the extension direction of the center axis AX. In this manner, the combustion gas flowing in the vicinity of the inner wall surface 20*i* of the combustion liner 20 is more easily guided toward the central portion of the combustion liner 20 in the second region R2 than in the first region R1. Accordingly, the combustion can be further promoted by mixing the combustion gas having a relatively low temperature in the second region R2 with the high-temperature combustion gas. Therefore, the difference between the temperature of the combustion gas in the second region R2 and the temperature of the combustion gas in the first region R1 can be suppressed, and the generation of carbon monoxide can be suitably suppressed even during the partial load operation of the gas turbine 1.

(2) A gas turbine combustor (combustor 3) according to at least one embodiment of the present disclosure includes a combustion liner 20 in which a combustion region through which combustion gas generated by combustion of a fuel is allowed to flow is formed on an inner side and that includes an ejection part 20*e* that is formed at an end portion on a downstream side and that forms an ejection port 20*d* for the combustion gas; and a plurality of narrowing parts 71 that are provided on an inner wall surface 20*i* of the combustion liner 20 at intervals in a circumferential direction and that protrude toward the inner side of the combustion liner 20. A center axis AX of the combustion liner 20 includes an upstream center axis (first center axis AX1) extending in a linear shape in an upstream region of the combustion liner 20, and extends in a direction different from an extension direction of the upstream center axis (first center axis AX1) in the ejection part 20*e*. The combustion liner 20 comprises a first region R1 and a second region R2, the first region R1 and the second region R2 being divided by a virtual plane Pv2 which includes the center axis AX extending from the upstream region to the ejection part 20*e*, and the virtual plane Pv2 is orthogonal to a virtual flat plane Pv1 that includes the center axis AX. A distance traced along the inner wall surface 20*i* in the virtual flat plane Pv1 from a position corresponding to a reference position on the upstream center axis (first center axis AX1) to the ejection port 20*d* is shorter in the second region R2 than in the first region R1. A total value S2 of projected areas of the narrowing parts 71 (second narrowing parts 712) present in the second region R2 when viewed from the extension direction of the center axis AX is larger than a total value S1 of projected areas of the narrowing parts 71 (first narrowing parts 711) present in the first region R1 when viewed from the extension direction of the center axis AX.

According to the configuration of (2), the total value S2 of the projected areas of the narrowing parts 71 (second narrowing parts 712) present in the second region R2 when viewed from the extension direction of the center axis AX is set to be larger than the total value S1 of the projected areas of the narrowing parts 71 (first narrowing parts 711) present in the first region R1 when viewed from the extension direction of the center axis AX. In this manner, the combustion gas flowing in the vicinity of the inner wall surface 20*i* of the combustion liner 20 is more easily guided toward the central portion of the combustion liner 20 in the second region R2 than in the first region R1. Accordingly, the combustion can be further promoted by mixing the combustion gas having a relatively low temperature in the second region R2 with the high-temperature combustion gas. Therefore, the difference between the temperature of the combustion gas in the second region R2 and the temperature of the combustion gas in the first region R1 can be suppressed, and the generation of carbon monoxide can be suitably suppressed even during the partial load operation of the gas turbine 1.

(3) In some embodiments, in the configuration of (1) or (2), a height (protrusion height h2) of at least one of the narrowing part 71 (second narrowing part 712) present in the second region R2 in a radial direction of the combustion liner 20 may be higher than a height (protrusion height h1) of the narrowing part 71 (first narrowing part 711) present in the first region R1 in the radial direction.

According to the configuration of (3), the combustion gas flowing in the vicinity of the inner wall surface 20*i* of the combustion liner 20 in the second region R2 is easily guided toward the central portion of the combustion liner 20, and is easily mixed with the high-temperature combustion gas to promote combustion.

(4) In some embodiments, in the configuration of (3), the height (protrusion height h2) of at least one of the narrowing parts 71 (second narrowing part 712) present in the second region R2 in the radial direction of the combustion liner 20 may be 1.5 times or more and 3.0 times or less the height (protrusion height h1) of the narrowing part 71 (first narrowing part 711) present in the first region R1 in the radial direction.

The higher the height (protrusion height h2) of the narrowing part 71 (second narrowing part 712) present in the second region R2 in the radial direction is, the more easily the combustion gas flowing in the vicinity of the inner wall surface 20*i* of the combustion liner 20 is guided toward the central portion of the combustion liner 20. However, there is a concern that the flow of the main flow of the combustion gas may be disturbed and the combustion efficiency may be adversely affected.

According to the configuration of (4), the combustion gas flowing in the vicinity of the inner wall surface 20*i* of the combustion liner 20 in the second region R2 can be guided toward the central portion of the combustion liner 20 and can be mixed with the high-temperature combustion gas to promote the combustion while suppressing the influence on the flow of the main flow of the combustion gas.

(5) In some embodiments, in any one of the configurations of (1) to (4), a width w2 of at least one of the narrowing parts 71 (second narrowing part 712) present in the second region R2 in the circumferential direction of the combustion liner 20 may be larger than a width w1 of the narrowing part 71 (first narrowing part 711) present in the first region R1 in the circumferential direction.

According to the configuration of (5), the combustion gas flowing in the vicinity of the inner wall surface 20*i* of the combustion liner 20 in the second region R2 is easily guided toward the central portion of the combustion liner 20, and is easily mixed with the high-temperature combustion gas to promote combustion.

(6) In some embodiments, in any one of the configurations of (1) to (5), a surface (inclined surface 71*u*) of the narrowing part 71 on an upstream side may be an inclined surface 71*u* that is inclined to approach the center axis AX while moving toward the downstream side of the combustion liner 20. An angle θ2 at which the inclined surface 71*u* for at least one of the narrowing parts 71 (second narrowing parts 712) present in the second region R2 is inclined with respect to the inner wall surface 20*i* may be larger than an angle θ1 at which the inclined surface 71*u* for the narrowing part 71 (first narrowing part 711) present in the first region R1 is inclined with respect to the inner wall surface 20*i*.

As the angle at which the inclined surface 71*u* is inclined with respect to the inner wall surface 20*i* becomes larger, the combustion gas flowing in the vicinity of the inner wall surface 20*i* of the combustion liner 20 is more easily guided toward the central portion of the combustion liner 20.

According to the configuration of (6), the combustion gas flowing in the vicinity of the inner wall surface 20*i* of the combustion liner 20 in the second region R2 is easily guided toward the central portion of the combustion liner 20, and is easily mixed with the high-temperature combustion gas to promote combustion.

(7) In some embodiments, in the configuration of (6), the angle θ2 at which the inclined surface 71*u* for at least one of the narrowing parts 71 (second narrowing parts 712) present in the second region R2 is inclined with respect to the inner wall surface 20*i* may be 50 degrees or more and 85 degrees or less.

As the angle at which the inclined surface 71*u* is inclined with respect to the inner wall surface 20*i* becomes larger, the combustion gas flowing in the vicinity of the inner wall surface 20*i* of the combustion liner 20 is more easily guided toward the central portion of the combustion liner 20. However, there is a concern that the flow of the main flow of the combustion gas may be disturbed and the combustion efficiency may be adversely affected.

According to the configuration of (7), the combustion gas flowing in the vicinity of the inner wall surface 20*i* of the combustion liner 20 in the second region R2 can be guided toward the central portion of the combustion liner 20 and can be mixed with the high-temperature combustion gas to promote the combustion while suppressing the influence on the flow of the main flow of the combustion gas.

(8) In some embodiments, in any one of the configurations (1) to (7), a plurality of fuel nozzles (main nozzles 64) may be disposed in the combustion liner 20 at intervals in the circumferential direction of the combustion liner 20. At least one of the narrowing parts 71 is located between two of the fuel nozzles (main nozzles 64) adjacent to each other in the circumferential direction when viewed from the extension direction of the center axis AX.

According to the configuration of (8), the combustion gas flowing in the vicinity of the inner wall surface 20*i* of the combustion liner 20 at a position where the temperature of the combustion gas tends to be low when viewed from the extension direction of the center axis AX can be guided toward the central portion of the combustion liner 20, and can be mixed with the high-temperature combustion gas to promote combustion.

(9) In some embodiments, in any one of the configurations of (1) to (8), the narrowing parts 71 (second narrowing parts 712) present in the second region R2 may be provided at a first position P1 along the center axis AX and at a second position P2 in which a position along the center axis AX is different from the first position P1.

According to the configuration of (9), the combustion gas flowing in the vicinity of the inner wall surface 20*i* of the combustion liner 20 can be guided toward the central portion of the combustion liner 20 by the narrowing part 71 (the second narrowing part 712) provided at the first position P1 and the second position P2. Therefore, the combustion can be further promoted by mixing the combustion gas flowing in the vicinity of the inner wall surface 20*i* of the combustion liner 20 in the second region R2 with a larger amount of the high-temperature combustion gas.

(10) In some embodiments, in the configuration of (9), the combustion liner 20 may include a first combustion liner (inner cylinder 12) and a second combustion liner (transition piece 14) disposed on a downstream side of the first combustion liner 20. The first position P1 may be a position in the first combustion liner (inner cylinder 12). The second position P2 may be a position in the second combustion liner (transition piece 14).

In some cases, cooling air is introduced from a connecting portion between the first combustion liner (inner cylinder 12) and the second combustion liner (transition piece 14). In such a case, a decrease in the temperature of the combustion gas can be suppressed in the region on the downstream side of the second position P2 when the narrowing part 71 (the second narrowing part 712) is provided on the inner wall surface 14*i* of the second combustion liner (the transition piece 14).

According to the configuration of (10), a decrease in the temperature of the combustion gas can be suppressed in the region on the downstream side of the second position P2.

(11) In some embodiments, in the configuration of (9) or (10), among the narrowing parts 71 (second narrowing parts 712) present in the second region R2, the narrowing part 71 (second narrowing part 712) provided at the second position P2 may be disposed at a position different in the circumferential direction from a position of the narrowing part 71 (second narrowing part 712) provided at the first position P1 among the narrowing parts 71 (second narrowing parts 712) present in the second region R2.

According to the configuration of (11), the effect of guiding the combustion gas by means of the narrowing part 71 (second narrowing part 712) provided at the second position P2 can be enhanced.

(12) In some embodiments, in any one of the configurations of (1) to (11), the combustion liner 20 may have a through-hole 23 that is open at a position overlapping the narrowing part 71 when viewed from the center axis AX toward a radial outer side.

According to the configuration of (12), the air (compressed air) flowing on the outer side of the combustion liner 20 can flow toward the narrowing part 71 via the through-hole 23, and the narrowing part 71 exposed to the high-temperature combustion gas can be cooled.

(13) A gas turbine 1 according to at least one embodiment of the present disclosure includes a compressor 2 that generates compressed air; the gas turbine combustor (combustor 3) according to any one of (1) to (12); and a turbine 4 that is rotationally driven by combustion gas generated by the gas turbine combustor (combustor 3).

According to the configuration of (13), the combustion can be further promoted by mixing the combustion gas having a relatively low temperature in the second region R2 with the high-temperature combustion gas. Therefore, the difference between the temperature of the combustion gas in the second region R2 and the temperature of the combustion gas in the first region R1 can be suppressed, and the generation of carbon monoxide can be suitably suppressed even during the partial load operation of the gas turbine 1.

REFERENCE SIGNS LIST

1: gas turbine
2: compressor

3: combustor (gas turbine combustor)
4: turbine
12: inner cylinder
12*i*: inner wall surface
14: transition piece
14*i*: inner wall surface
20: combustion liner
20*d*: ejection port
20*e*: ejection part
20*i*: inner wall surface
23: through-hole
64: main nozzle (fuel nozzle)
70: narrowing member
71: narrowing part
71*u*: inclined surface
711: first narrowing part
712: second narrowing part

The invention claimed is:

1. A gas turbine combustor comprising:

a can combustor liner that includes an inner wall surface defining a combustion region through which combustion gas generated by combustion of a fuel is allowed to flow, an ejection port for the combustion gas being formed at an ejection part that is a downstream end portion of the can combustor liner in a flow direction of the combustion gas; and a plurality of narrowing parts that are provided on the inner wall surface of the can combustor liner at intervals in a circumferential direction and that protrude radially inward, wherein a center line of the can combustor liner includes an upstream center line extending linearly through the center of an upstream region of the can combustor liner in the flow direction, and a downstream center line which extends through the center of the ejection part in a direction different from an extension direction of the upstream center line, in a first cross section that includes the entire center line of the can combustion liner, the can combustor liner is divided into a first region and a second region by the center line of the can combustion liner, in a second cross section which intersects the center line of the can combustor liner and is orthogonal to the first cross section, the can combustor liner is divided into the first region and the second region by a straight line which intersects and is orthogonal to the center line of the can combustor liner, in the first cross section, a straight line obtained by extending the upstream center line passes through the first region in the ejection part, a total value of projected areas of the narrowing parts present in the second region when viewed from an extension direction of the center line is larger than a total value of projected areas of the narrowing parts present in the first region when viewed from the extension direction of the center line, and a height of at least one of the narrowing parts present in the second region in a radial direction of the can combustor liner is greater than a height of each of the narrowing parts present in the first region in the radial direction.

2. The gas turbine combustor according to claim 1, wherein the height of at least one of the narrowing parts present in the second region in the radial direction of the can combustor liner is 1.5 times or more and 3.0 times or less the height of each of the narrowing parts present in the first region in the radial direction.

3. The gas turbine combustor according to claim 1, wherein a width of at least one of the narrowing parts present in the second region in the circumferential direction of the can combustor liner is larger than a width of each of the narrowing parts present in the first region in the circumferential direction.

4. The gas turbine combustor according to claim 1, further comprising:

a plurality of fuel nozzles disposed in the can combustor liner at intervals in the circumferential direction of the can combustor liner, wherein at least one of the narrowing parts is located between two of the fuel nozzles adjacent to each other in the circumferential direction when viewed from the extension direction of the center axis.

5. The gas turbine combustor according to claim 1, wherein the can combustor liner has a through-hole that is open at a position overlapping one of the narrowing parts when viewed from the center line.

6. A gas turbine comprising:

a compressor that generates compressed air;

the turbine combustor according to claim 1; and a turbine that is rotationally driven by combustion gas generated by the gas turbine combustor.

7. A gas turbine combustor comprising:

a can combustor liner that includes an inner wall surface defining a combustion region through which combustion gas generated by combustion of a fuel is allowed to flow, an ejection port for the combustion gas being formed at an ejection part that is a downstream side end portion of the can combustor liner in a flow direction of the combustion gas; and a plurality of narrowing parts that are provided on the inner wall surface of the can combustor liner at intervals in a circumferential direction and that protrude radially inward, wherein a center line of the can combustor liner includes an upstream center line extending linearly through the center of an upstream region of the can combustor liner in the flow direction, and a downstream center line which extends through the center of the ejection part in a direction different from an extension direction of the upstream center line, in a first cross section that includes the entire center line of the can combustion liner, the can combustor liner is divided into a first region and a second region by the center line of the can combustion liner, in a second cross section which intersects the center line of the can combustor liner and is orthogonal to the first cross section, the can combustor liner is divided into the first region and the second region by a straight line which intersects and is orthogonal to the center line of the can combustor liner, a distance traced along the inner wall surface in the virtual flat plane from a position corresponding to a reference position on the upstream center line to the ejection port is shorter in the second region than in the first region, a total value of projected areas of the narrowing parts present in the second region when viewed from an extension direction of the center line is larger than a total value of projected areas of the narrowing parts present in the first region when viewed from the extension direction of the center line, and a height of at least one of the narrowing parts present in the second region in a radial direction of the can combustor liner is greater than a height of each of the narrowing parts present in the first region in the radial direction.

8. A gas turbine combustor comprising:

a can combustor liner that includes an inner wall surface defining a combustion region through which combustion gas generated by combustion of a fuel is allowed to flow, an ejection port for the combustion gas being formed at an ejection part that is a downstream end portion of the can combustor liner in a flow direction of the combustion gas; and a plurality of narrowing parts that are provided on the inner wall surface of the can combustor liner at intervals in a circumferential direction and that protrude radially inward, wherein a center line of the can combustor liner includes an upstream center line extending linearly through the center of an upstream region of the can combustor liner in the flow direction, and a downstream center line which extends through the center of the ejection part in a direction different from an extension direction of the upstream center line, in a first cross section that includes the entire center line of the can combustion liner, the can combustor liner is divided into a first region and a second region by the center line of the can combustion liner, in a second cross section which intersects the center line of the can combustor liner and is orthogonal to the first cross section, the can combustor liner is divided into the first region and the second region by a straight line which intersects and is orthogonal to the center line of the can combustor liner, in the first cross section, a straight line obtained by extending the upstream center axis line passes through the first region in the ejection part, a total value of projected areas of the narrowing parts present in the second region when viewed from an extension direction of the center line is larger than a total value of projected areas of the narrowing parts present in the first region when viewed from the extension direction of the center line, a surface of each of the narrowing parts, on an upstream side in the flow direction, is an inclined surface that is inclined to approach the center line while moving toward the downstream side of the can combustor liner, and an angle at which the inclined surface for at least one of the narrowing parts present in the second region is inclined with respect to the inner wall surface is larger than an angle at which the inclined surface for each of the narrowing parts present in the first region is inclined with respect to the inner wall surface.

9. The gas turbine combustor according to claim 8, wherein the angle at which the inclined surface for at least one of the narrowing parts present in the second region is inclined with respect to the inner wall surface is 50 degrees or more and 85 degrees or less.

10. A gas turbine combustor comprising:

a can combustor liner that includes an inner wall surface defining a combustion region through which combustion gas generated by combustion of a fuel is allowed to flow, an ejection port for the combustion gas being formed at an ejection part that is a downstream end portion of the can combustor liner in a flow direction of the combustion gas; and a plurality of narrowing parts that are provided on the inner wall surface of the can combustor liner at intervals in a circumferential direction and that protrude radially inward, wherein a center line of the can combustor liner includes an upstream center line extending linearly through the center of an upstream region of the can combustor liner in the flow direction, and a downstream center line which extends through the center of the ejection part in a direction different from an extension direction of the upstream center line, in a first cross section that includes the entire center line of the can combustion liner, the can combustor liner is divided into a first region and a second region by the center line of the can combustion liner, in a second cross section which intersects the center line of the can combustor liner and is orthogonal to the first cross section, the can combustor liner is divided into the first region and the second region by a straight line which intersects and is orthogonal to the center line of the can combustor liner, in the first cross section, a straight line obtained by extending the upstream center line passes through the first region in the ejection part, a total value of projected areas of the narrowing parts present in the second region when viewed from an extension direction of the center line is larger than a total value of projected areas of the narrowing parts present in the first region when viewed from the extension direction of the center line, and the narrowing parts present in the second region are provided at a first position along the center line and at a second position in which a position along the center line is different from the first position.

11. The gas turbine combustor according to claim 10, wherein the can combustor liner includes a first combustion liner and a second combustion liner disposed on a downstream side of the first combustion liner, the first position is a position in the first combustion liner, and the second position is a position in the second combustion liner.

12. The gas turbine combustor according to claim 10, wherein, among the narrowing parts present in the second region, a narrowing part provided at the second position is disposed at a position different in the circumferential direction from a position of a narrowing part provided at the first position among the narrowing parts present in the second region.

* * * * *